(12) United States Patent
Hollenbaugh, Jr. et al.

(10) Patent No.: US 11,547,973 B2
(45) Date of Patent: Jan. 10, 2023

(54) ASYMMETRIC POLYTETRAFLUOROETHYLENE COMPOSITE HAVING A MACRO-TEXTURED SURFACE AND METHOD FOR MAKING THE SAME

(71) Applicants: W.L. Gore & Associates, Inc., Newark, DE (US); W. L. Gore & Associates GmbH, Putzbrunn (DE)

(72) Inventors: Donald L. Hollenbaugh, Jr., North East, MD (US); Bernadette Parsons, Newark, DE (US); Gopalan V. Balaji, Kennett Square, PA (US); Rebecca Buxbaum, Newark, DE (US)

(*) Notice: Subject to any disclaimer, the term of this patent is extended or adjusted under 35 U.S.C. 154(b) by 0 days.

(21) Appl. No.: 17/211,313

(22) Filed: Mar. 24, 2021

(65) Prior Publication Data

US 2021/0205764 A1 Jul. 8, 2021

Related U.S. Application Data

(62) Division of application No. 15/183,897, filed on Jun. 16, 2016, now Pat. No. 10,987,638.
(Continued)

(51) Int. Cl.
*B01D 71/36* (2006.01)
*B32B 27/32* (2006.01)
(Continued)

(52) U.S. Cl.
CPC ......... *B01D 71/36* (2013.01); *B01D 67/0027* (2013.01); *B01D 69/12* (2013.01);
(Continued)

(58) Field of Classification Search
CPC .... B01D 71/36; B01D 67/0027; B01D 69/12; B01D 2325/06; B01D 65/003;
(Continued)

(56) References Cited

U.S. PATENT DOCUMENTS

| 3,953,566 A | 4/1976 | Gore |
| 4,576,869 A | 3/1986 | Malhotra |

(Continued)

FOREIGN PATENT DOCUMENTS

| JP | 1989(H01)105734 | 4/1989 |
| JP | 1997(H09)509081 | 9/1997 |

(Continued)

*Primary Examiner* — Waqaas Ali
(74) *Attorney, Agent, or Firm* — Amy Miller

(57) ABSTRACT

Polytetrafluoroethylene (PTFE) composite articles that have a macro textured surface. The composite articles include at least two different PTFE membranes in a layered or stacked configuration. The composite article has a macro textured surface characterized by a plurality of strands raised from the surface of the PTFE membrane. The strands may be formed of either interconnected nodes of PTFE or of at least one nodal mass of PTFE and have a length equal to or greater than about 1.5 mm. The macro textured surface provides a topography to the first PTFE membrane. The composite articles have a bubble point from about 3.0 psi to about 200 psi, a thickness from about 0.01 to about 3.0 mm, and a bulk density from about 0.01 g/cm³ to about 1.0 g/cm³.

2 Claims, 25 Drawing Sheets

Related U.S. Application Data

(60) Provisional application No. 62/182,213, filed on Jun. 19, 2015.

(51) Int. Cl.

| | |
|---|---|
| *B29C 65/00* | (2006.01) |
| *B32B 7/12* | (2006.01) |
| *B29C 65/48* | (2006.01) |
| *B32B 37/12* | (2006.01) |
| *B32B 38/00* | (2006.01) |
| *B32B 27/08* | (2006.01) |
| *B32B 37/18* | (2006.01) |
| *B01D 67/00* | (2006.01) |
| *B32B 27/28* | (2006.01) |
| *B32B 5/16* | (2006.01) |
| *B32B 3/30* | (2006.01) |
| *B32B 5/30* | (2006.01) |
| *B01D 69/12* | (2006.01) |
| *B32B 27/30* | (2006.01) |
| *B32B 7/14* | (2006.01) |
| *B32B 27/12* | (2006.01) |
| *B32B 7/022* | (2019.01) |
| *B29L 31/00* | (2006.01) |
| *B29L 31/14* | (2006.01) |
| *B29K 627/18* | (2006.01) |

(52) U.S. Cl.
CPC ............ *B29C 65/48* (2013.01); *B29C 66/032* (2013.01); *B29C 66/45* (2013.01); *B29C 66/71* (2013.01); *B29C 66/72* (2013.01); *B29C 66/7311* (2013.01); *B29C 66/7313* (2013.01); *B29C 66/7315* (2013.01); *B29C 66/7352* (2013.01); *B32B 3/30* (2013.01); *B32B 5/16* (2013.01); *B32B 5/30* (2013.01); *B32B 7/022* (2019.01); *B32B 7/12* (2013.01); *B32B 7/14* (2013.01); *B32B 27/08* (2013.01); *B32B 27/12* (2013.01); *B32B 27/28* (2013.01); *B32B 27/304* (2013.01); *B32B 27/322* (2013.01); *B32B 37/12* (2013.01); *B32B 37/182* (2013.01); *B32B 38/0012* (2013.01); *B01D 2325/06* (2013.01); *B29K 2627/18* (2013.01); *B29K 2995/0063* (2013.01); *B29K 2995/0077* (2013.01); *B29L 2031/14* (2013.01); *B29L 2031/755* (2013.01); *B32B 2264/0257* (2013.01); *B32B 2270/00* (2013.01); *B32B 2307/538* (2013.01); *B32B 2307/54* (2013.01); *B32B 2307/72* (2013.01); *B32B 2307/732* (2013.01); *B32B 2405/00* (2013.01)

(58) Field of Classification Search
CPC ....... B29C 65/48; B29C 66/032; B29C 66/45; B29C 66/71; B29C 66/72; B29C 66/7311; B29C 66/7313; B29C 66/7315; B29C 66/7352; B32B 3/30; B32B 5/16; B32B 5/30; B32B 7/022; B32B 7/12; B32B 7/14; B32B 27/08; B32B 27/12; B32B 27/28; B32B 27/304; B32B 27/322; B32B 37/12; B32B 37/182; B32B 38/0012; B32B 2264/0257; B32B 2270/00; B32B 2307/538; B32B 2307/54; B32B 2307/72; B32B 2307/732; B32B 2405/00; B32B 5/022; B32B 2250/02; B32B 2250/242; B32B 2255/10; B32B 2262/0253; B32B 2305/20; B32B 2307/30; B32B 2307/51; B32B 2327/18; B29K 2627/18; B29K 2995/0063; B29K 2995/0077; B29L 2031/14; B29L 2031/755

See application file for complete search history.

(56) References Cited

U.S. PATENT DOCUMENTS

| | | |
|---|---|---|
| 4,902,423 A | 2/1990 | Bacino |
| 5,476,589 A | 12/1995 | Bacino |
| 5,814,405 A | 9/1998 | Branca et al. |
| 6,218,000 B1 | 4/2001 | Rudolf |
| 6,235,377 B1 | 5/2001 | Dillon |
| 6,342,294 B1 | 1/2002 | Ruefer et al. |
| 6,517,919 B1 | 2/2003 | Griffin |
| 6,541,589 B1 | 4/2003 | Baillie |
| 6,780,497 B1 | 8/2004 | Walter |
| 7,306,841 B2 | 12/2007 | Ruefer et al. |
| 2002/0001704 A1* | 1/2002 | Ruefer .................. C08J 5/00 428/311.51 |

FOREIGN PATENT DOCUMENTS

| | | |
|---|---|---|
| JP | 1999(H11)501973 | 2/1999 |
| JP | 2008-525692 A | 7/2008 |
| JP | 2010018800 | 1/2010 |
| JP | 2011183814 | 9/2011 |
| JP | 2012512770 | 6/2012 |

* cited by examiner

ASYMMETRIC POLYTETRAFLUOROETHYLENE COMPOSITE HAVING A MACRO-TEXTURED SURFACE AND METHOD FOR MAKING THE SAME

FIELD

The present invention relates generally to polytetrafluoroethylene (PTFE) membranes, and more specifically, to polytetrafluoroethylene composite articles having a macro textured surface. Methods for making the composite articles are also disclosed.

BACKGROUND

A conventional method of manufacturing expanded PTFE (ePTFE) layer is described in U.S. Pat. No. 3,953,566 to Gore. In the methods described therein, a PTFE paste is formed by combining a PTFE resin and a lubricant. The PTFE paste may be extruded. After the lubricant is removed from the extruded paste, the PTFE article is stretched to create a porous, high strength PTFE article. The expanded PTFE layer is characterized by a porous, open microstructure that has nodes interconnected by fibrils.

ePTFE articles with a variety of microstructures of nodes and fibrils are known in the art. Some such articles are described in U.S. Pat. Nos. 4,902,423, 5,814,405, 5,476,589, 6,342,294.

U.S. Pat. No. 6,780,497 describes a method using laser to surface modify an ePTFE structure to create a macroroughened surface that has the capability to remain microporous throughout. The process creates a structure including gnarled nodes.

It is desirable to modify the ePTFE surface without using such an extraneous process and still be able to create a patterned ePTFE surface.

SUMMARY

One embodiment of the invention relates to a composite article that includes (1) a first polytetrafluoroethylene (PTFE) membrane that has a first surface and a second surface and (2) a second PTFE membrane positioned on the second surface of the first membrane where the first surface of the first PTFE membrane includes a plurality of strands raised from the first surface. At least one of the strands has a length greater than about 1.5 mm. The strands include interconnected nodes of PTFE. The composite article has a bulk density from about 0.01 g/cm$^3$ to about 1.0 g/cm$^3$, a bubble point from about 3.0 psi to about 200 psi, and a thickness from about 0.01 mm to about 3.0 mm. In at least one embodiment, the strands are non-linear and form a visible pattern on the first surface of the first PTFE membrane. In at least one exemplary embodiment, the second PTFE membrane has a matrix tensile strength that is at least 1.5 times greater than the matrix tensile strength of the first PTFE membrane in both the x- and the y-directions. The composite articles have a macro textured surface which can be optically observed and which provides a topography to the first PTFE membrane.

A second embodiment of the invention relates to a composite article that includes (1) a first polytetrafluoroethylene (PTFE) membrane that has a first surface and a second surface and (2) a second PTFE membrane positioned on the second surface of the first membrane where the first surface of the first PTFE membrane includes a plurality of strands raised from the first surface. At least one of the strands has a length greater than about 1.5 mm. The strands include at least one nodal mass of PTFE. The composite article has a bulk density from about 0.01 g/cm$^3$ to about 1.0 g/cm$^3$, a bubble point from about 3.0 psi to about 200 psi and a thickness from about 0.01 mm to about 3.0 mm. In at least one embodiment, the strands are non-linear and form a visible pattern on the first surface of the first PTFE membrane. In at least one exemplary embodiment, the second PTFE membrane has a matrix tensile strength that is at least 1.5 times greater than the matrix tensile strength of the first PTFE membrane in both the x- and the y-directions. The composite articles have a macro textured surface which can be optically observed and which provides a topography to the first PTFE membrane.

A third embodiment of the invention relates to a composite article produced by the process including (1) obtaining a first PTFE membrane having a first surface and a second surface, (2) obtaining a second PTFE membrane having a matrix tensile strength that is greater than a matrix tensile strength of the first PTFE membrane, (3) positioning the second PTFE membrane on the second surface of the first membrane to form a layered product, (4) expanding the layered product in the y direction at an engineering strain rate from about 0.5%/sec to about 300%/sec and a stretch rate from about 10% to about 350% to form an expanded product, and (4) expanding the expanded product in the x-direction at an engineering strain rate from about 3.0% to about 600% and a stretch ratio from about 0% to about 2000% to form a composite article. The first surface of the composite article includes a plurality of strands raised from the first surface. At least one of the strands has a length equal to or greater than about 1.5 mm. The first surface of the composite article corresponds to the first surface of the first PTFE membrane. In a further step, the composite article may be sintered. An adhesive may be applied to one of the first PTFE membrane and the second PTFE membrane to adhere the first PTFE membrane to the second PTFE membrane.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

GLOSSARY

Figure 1:
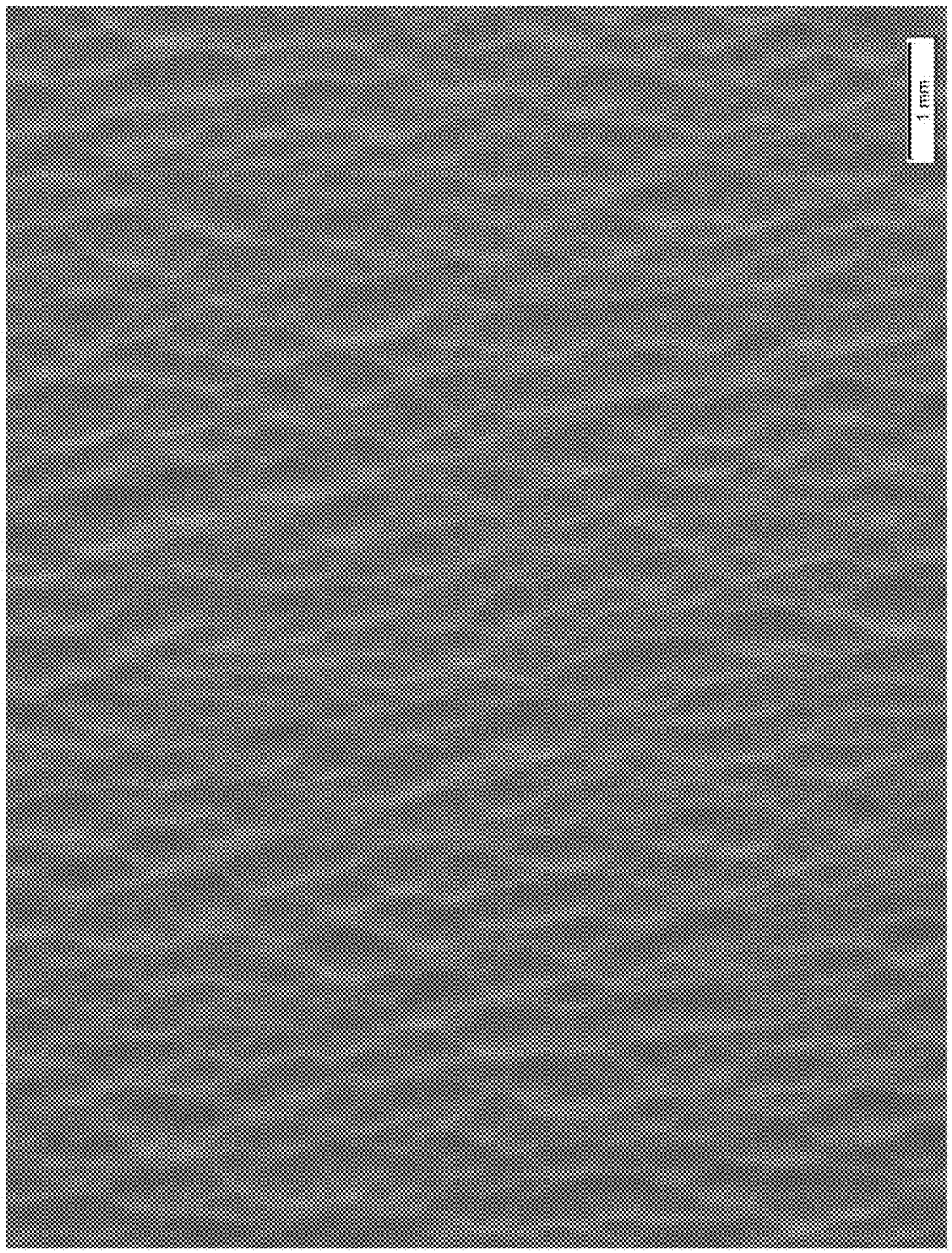
FIG. 1 is an optical microscopic image of the surface of the first PTFE membrane in the composite article of Example 1 taken at 7× in accordance with one embodiment of the invention.

As used herein, the term "optically observed" is meant to denote that an object can be observed with the use of an optical microscope and/or with the naked eye.

As used herein, the term "on" is meant to denote an element, such as a polytetrafluoroethylene (PTFE) membrane, is directly on another element or intervening elements may also be present.

As used herein, the term "biaxial" is meant to describe a polymer, membrane, preform, or article that is expanded in at least two directions, either simultaneously or sequentially.

As used herein, the term "lubricant" is meant to describe a processing aid that includes, and in some embodiments, consists of, an incompressible fluid that is not a solvent for the polymer at processing conditions. The fluid-polymer surface interactions are such that it is possible to create a homogenous mixture.

As used herein, the term "wet state" is meant to describe a PTFE membrane that has not been dried to remove lubricant.

The term "dry state" as used herein is meant to describe a PTFE membrane that has been dried to remove lubricant.

"Fine powder PTFE" as used herein is meant to denote that the PTFE resin was prepared by an aqueous dispersion polymerization technique.

As used herein, the terms "x-direction" and "y-direction" are meant to denote transverse and longitudinal directions, respectively.

DETAILED DESCRIPTION

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

The present invention is directed to polytetrafluoroethylene (PTFE) composite articles that have a macro textured surface which can be optically observed. The composite articles include at least two different PTFE membranes in a layered or stacked configuration, each PTFE membrane having a microstructure of nodes interconnected by fibrils. A first PTFE membrane in the composite article has a microstructure that is more "open" than a second PTFE membrane in the composite article. The composite articles have a bubble point from about 3.0 psi to about 200 psi, a thickness from about 0.01 to about 3.0 mm, and a bulk density less than about 1.0 g/cm$^3$.

As discussed above, the composite article is formed of at least two PTFE membranes, which may be formed from the same or different PTFE starting material. In addition, the first and second PTFE membranes microstructures that differ from each other. The difference between the microstructure of the first PTFE membrane and the microstructure of the second PTFE membrane, and thus the asymmetry of the composite article, may be caused by, for example, a difference in pore size, a difference in node and/or fibril geometry or size, and/or a difference in density. Notwithstanding the mechanism utilized to achieve different microstructures achieved within the composite article, the first PTFE membrane possesses a microstructure that is more "open" than the microstructure of the second PTFE layer. As used herein, the term "open" as opposed to "tight" means that the pore size of the first "open" microstructure is larger than that of the second "tight" microstructure as evidenced by bubble point or any suitable method for characterizing pore size.

The PTFE starting material used for forming the first and second PTFE membranes can be of any type of PTFE resin which lends itself to the formation of fibrils and nodes upon expansion. In one exemplary embodiment, the PTFE starting material may be a PTFE homopolymer or a blend of PTFE homopolymers. In another embodiment, the PTFE starting material may be a blend of a PTFE homopolymer and a PTFE copolymer in which comonomer units are not present in amounts which cause the copolymer to lose the non-melt processible characteristics of a pure homopolymer PTFE. Examples of suitable comonomers in the PTFE copolymer include, but are not limited to, olefins such as ethylene and propylene; halogenated olefins such as hexafluoropropylene (HFP), vinylidene fluoride (VDF), and chlorofluoroethylene (CFE); perfluoroalkyl vinyl ether (PPVE), and perfluorosulfonyl vinyl ether (PSVE). In yet another embodiment, the first and/or second PTFE membrane may be formed from a blend of high molecular weight PTFE homopolymer and a lower molecular weight modified PTFE polymer.

The first and second PTFE starting materials are selected so that, when taken in combination with the selected processing conditions, the resultant first PTFE membrane has a lower matrix tensile strength than the second PTFE membrane. In at least one exemplary embodiment, the second PTFE membrane has a matrix tensile strength that is at least 1.5 times greater than the first PTFE membrane in both the x- and the y-directions.

A first PTFE membrane may be formed by blending a suitable first PTFE starting material with a lubricant. Non-limiting examples of lubricants for use herein include light mineral oil, aliphatic hydrocarbons, aromatic hydrocarbons, and halogenated hydrocarbons. The resulting mixture of PTFE resin and lubricant may be formed into a cylindrical pellet and extruded through a die at a reduction ratio from about 10:1 to about 150:1, or from about 25:1 to about 90:1 to form a tape. The tape may then be calendered between rolls to a desired thickness at a calendering ratio from about 1.1:1 to about 50:1, or from about 1.1:1 to about 20:1 to form the first PTFE membrane.

In at least one embodiment, the first PTFE membrane is formed without a drying step and is layered with the second PTFE membrane in a wet state. It is, however, within the purview of the invention to dry either the tape (pre-calendering) or the first PTFE membrane (post calendering) prior to layering with the second PTFE membrane.

Please note that although reference is made herein with respect to first and second PTFE membranes for ease of discussion, a greater number of PTFE membranes may be included in the composite article. In addition, the PTFE membranes within the composite article may be derived from the same PTFE starting material, from a different PTFE starting material, or a combination of PTFE starting materials. Also, some or all of the PTFE membranes in the composite article may vary in composition, bubble point, thickness, air permeability, mass/area, etc. from each other.

The second PTFE membrane may be formed by blending a second suitable PTFE starting material with a lubricant. Non-limiting examples of lubricants for use herein include light mineral oil, aliphatic hydrocarbons, aromatic hydrocarbons, and halogenated hydrocarbons. The resulting mixture may be formed into a cylindrical pellet and ram extruded through a die at a reduction ratio from about 10:1 to about 150:1, or from about 50:1 to about 120:1 to form a tape. The tape may then be calendered between rolls to a desired thickness at a calendering ratio from about 1.1 to about 20:1 or from about 1.1: to about 10:1. The calendered tape may then be expanded in one or more directions and dried to remove the lubricant. For example, the calendered tape may be expanded in a longitudinal and/or a transverse direction at an expansion ratio from about 1.1:1 to about 20:1 or about 1.1:1 to about 6:1. The resultant second PTFE membrane has a node and fibril microstructure. It is to be appreciated that the second PTFE membrane may be formed without drying the tape and/or membrane and may be layered with the first PTFE membrane in a wet state.

In forming the composite article, the first PTFE membrane and the second PTFE membrane are layered or positioned one on top of the other in a stacked configuration to form a layered product. The first and second PTFE membranes may be positioned in a stacked configuration, for example, by simply laying the membranes on top of each other. Embodiments employing two PTFE starting materials that are co-extruded to produce a layered product is also considered to be within the purview of the invention. The layered product may then be reduced to a desired thickness, such as by calendering or placing the layered product in a press. The thickness of the layered product may range from about 0.01 mm to about 3.0 mm, from about 0.01 mm to about 2 mm, from about 0.03 mm to about 1.0 mm, from about 0.05 mm to about 0.7 mm, or from about 0.1 mm to about 0.5 mm. Optionally, the layered product may be heated to remove any lubricant present. The layered product is biaxially stretched and optionally sintered at a temperature above the crystalline melt temperature of the PTFE to form the composite article.

The layered product may be stretched in the x- and y-direction, either sequentially or simultaneously. For instance, the layered product may be stretched in the y-direction at an average engineering strain rate from about 0.5%/sec to about 300%/sec, or from about 0.5%/sec to about 150%/sec and a stretch amount from about 10% to about 350% or from about 10% to about 300% and subsequently in the x-direction at an average engineering strain rate from about 3% to about 600%, or from about 10% to about 400% and a stretch amount from about zero % to about 2000% or from about 1.0% to about 1600%, or vice versa (e.g., stretched first in the x-direction and then stretched in the y direction). In at least one embodiment, the layered product is simultaneously stretched in the x- and y-directions at an average engineering strain rate from about 10%/sec to about 500%/sec, or from about 20%/sec to about 250%/sec and a stretch amount from about 10% to about 2000%.

The resulting composite article has a unique macro textured surface characterized by strands formed of either interconnected nodes of PTFE or of at least one nodal mass of PTFE. The strands have a length equal to or greater than about 1.5 mm and are raised from the surface of the membrane. Additionally, the strands may be visually observed and are easily identified in an optical microscopic image. Looking at FIGS. 7 and 8 as one exemplary embodiment, the strands can be easily seen at both 7× and 32× magnification of the surface of the first PTFE membrane. The interconnected nodes may be individually observed with the use of a scanning electron microscope. A scanning electron micrograph of the surface of the first PTFE membrane shown in FIG. 7 taken at 100× magnification clearly shows the individual nodes forming the strand. Each of the nodes is a solid or substantially solid mass of PTFE and are arranged or grouped together during the formation and subsequent expansion of the first PTFE membrane so as to form one or more strands on the surface of the membrane. It is to be appreciated that remnants of nodes may be present between the individual nodes.

Figure 13:
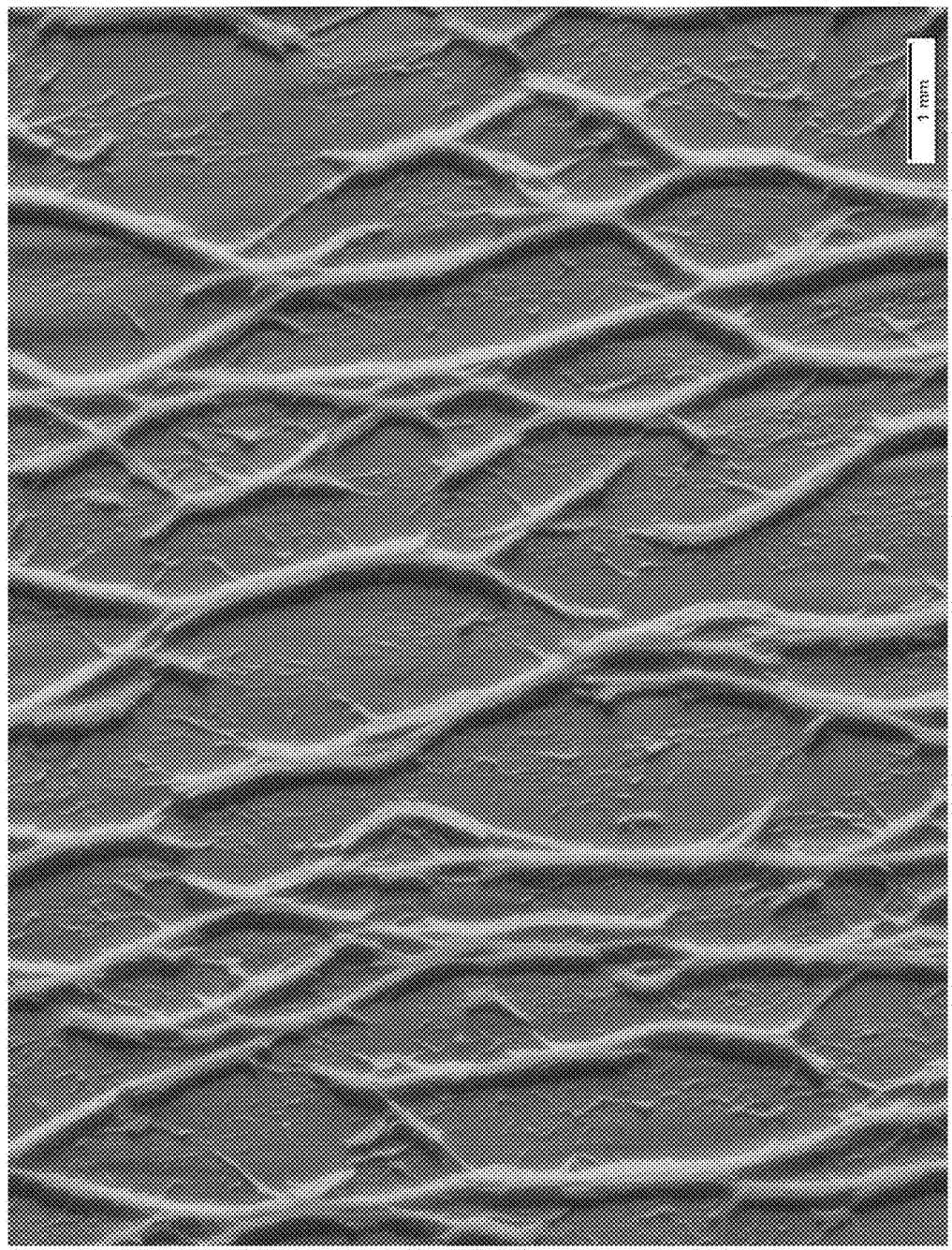
FIG. 13 is an optical microscopic image of the surface of the first PTFE membrane in the composite article of Example 7 taken at 7× in accordance with an embodiment of the invention.

In another exemplary embodiment, such as is shown in FIG. 13, the strands are also visually observable on the surface of the first PTFE membrane and are identifiable with an optical microscopic image. The strands are also raised from the surface of the first PTFE membrane. However, individual nodes are generally non-existent and one or more nodal mass of PTFE forms the strands.

At least one of the strands of interconnecting nodes and/or the strands containing one or more nodal mass of PTFE have a length equal to or greater than about 1.5 mm, 2.0 mm, 3.0 mm, or 4.0 mm when measured at any two points along the strand when viewed optically, such as with an optical microscope (e.g. at 7× or 32× magnification). In exemplary embodiments, some or all of the strands have a length equal to or greater than about 1.5 mm, 2.0 mm, 3.0 mm, or 4.0 mm when measured at any two points along the strand when viewed optically, such as with an optical microscope (e.g. at 7× or 32× magnification). The strands form a visible pattern on the first PTFE membrane, and may be viewed with the naked eye and/or an optical microscope. The strands of may run in a generally parallel configuration to each other in the first PTFE membrane in the y-direction. Additionally, the strands are generally non-linear, and may run in a substantially curvilinear fashion. In addition, the individual strands may cross over or intersect each other at one or more points on a strand or strands.

The composite article has a bubble point from about 3.0 psi to about 200 psi, from about 5 psi to about 100 psi, from about 10 psi to about 85 psi, or from about 15 psi to about 80 psi; a thickness from about 0.01 mm to about 3.0 mm, from about 0.3 mm to about 1.5 mm, or from about 0.05 mm to about 0.7 mm; and a bulk density from about 0.01 g/cm$^3$ to about 1.0 g/cm$^3$, from about 0.01 g/cm$^3$ to about 0.5 g/cm$^3$, or from about 0.05 g/cm$^3$ to about 0.25 g/cm$^3$. Additionally, the composite article may have a mass/area up to about 3000 g/m$^2$. In exemplary embodiments, the composite article has a mass/area from about 0.5 g/m$^2$ to about 750 g/m$^2$, from about 0.5 g/m$^2$ to about 450 g/m$^2$, from about 5.0 g/m$^2$ to about 150 g/m$^2$, or from about 10 g/m$^2$ to about 100 g/m$^2$; and a Gurley number from about 0.01 second to about 1000 seconds or from about 1 second to about 100 seconds. In one or more embodiment, the composite article is a sheet, tape, or tube. The macro textured surface provides a topography to the first PTFE membrane.

Optional support layers may be located between the first and second PTFE membranes or adjacent to the first and/or second PTFE membrane. Non-limiting examples of suitable support layers include polymeric woven materials, non-woven materials, knits, nets, and/or porous membranes. In addition, the first and second PTFE membranes may be adhered to each other, or to another membrane or support structure, with a thermoplastic resin or other adhesive, either continuously or discontinuously, such as, for example, fluorinated ethylene propylene (FEP), perfluoroalkoxy polymer resin (PFA), and tetrafluoroethylene hexafluoropropylene and vinylidene fluoride (THV), and/or polyvinylidene fluoride (PVDF).

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

TEST METHODS

It should be understood that although certain methods and equipment are described below, other methods or equipment determined suitable by one of ordinary skill in the art may be alternatively utilized.

Thickness

Membrane thickness was determined by placing the membrane between the two plates of a Mitutoyo Tektronix snap gauge (Part Number 547-400S).

Mass Per Area (Mass/Area)

The mass/area of the membrane was calculated by measuring the mass of a well-defined area of the sample using a scale. The sample was cut to a defined area using a die or any precise cutting instrument.

Density

The density was calculated by dividing the Mass per Area by Thickness.

Gurley Air Flow

The Gurley air flow test measures the time in seconds for 100 cm$^3$ of air to flow through a 6.45 cm$^2$ sample at 12.4 cm of water pressure. The samples were measured in a Gurley Densometer Model 4340 Automatic Densometer.

Bubble Point

The bubble point was measured according to the general teachings of ASTM F316-03 using a Capillary Flow Porometer (Model 3 Gzh from Quantachrome Instruments). The sample holder comprised a porous metal plate (Part Number: 04150-10030-25, Quantachrome Instruments), 25.4 mm in diameter and a plastic mask (Part Number ABF-300, Professional Plastics), 20 mm I.D.×24.5 mm O.D. in diameter. The sample was placed in between the metal plate and the plastic mask. The sample was then clamped down and sealed using an o-ring (Part Number: 51000-25002000, Quantachrome Instruments). The sample was wet with the test fluid (Silicone fluid having a surface tension of 20.1 dynes/cm). Using the 3GWin software version 2.1, the following parameters were set as specified in Table I and Table II.

TABLE 1

| Run Setting BP range | Pore Size Start Pressure (psi) | Pore Size End Pressure (psi) | Pore Size Start Size (micron) | Pore Size End Size (micron) |
| --- | --- | --- | --- | --- |
| BP_9-50 psi | 8.97 | 50.48 | 1.3 | 0.231 |
| BP_50-150 psi | 50.7 | 149.1 | 0.23 | 0.0782 |
| BP_50-120 psi | 50.7 | 120 | 0.23 | 0.0972 |

TABLE 2

| Parameter | Bubble Point |
| --- | --- |
| Run Type | Wet Only |
| Number Data Points | 256 |
| Pressure Control | |
| Use Normal Equilibrium | TRUE |
| Use Tol | FALSE |
| Use Time | FALSE |
| Use Rate | FALSE |
| Use Low Flow Sensor | FALSE |
| Time Out | NA |
| Equil Time | NA |
| Run Rate | NA |
| Pressure Tolerance | NA |
| Flow Tolerance | NA |
| Smoothing | |
| UseMovAve | FALSE |
| MovAveWet Interval | NA |
| MovAveDry Interval | NA |
| Lowess Dry | 0.050 |
| Lowess Wet | 0.050 |
| Lowess Flow | 0.050 |
| Lowess Num | 0.100 |
| MinSizeThreshold | 0.98 |
| Bubble Point Parameters | |
| UseBpAuto | TRUE |
| UseBpThreshold (L/min) | FALSE |
| UseBpThreshold (Abs/cm$^2$) | FALSE |
| UseBpThresholdNumber | FALSE |
| BpAutoTolerance (manual) | 1% |
| BpThresholdValue (manual) | NA |
| BpThreshold (Abs/cm$^2$) value | 0 |

Optical Microscope Images

Optical microscopic images were generated using the Olympus SZX12 microscope at a magnification of 7× and 32×.

SEM Sample Preparation Method

SEM images were generated using a high resolution field emission cryogenic microscope (Hitachi S4700 FE-SEM).

EXAMPLES

Example 1

A first polytetrafluoroethylene (PTFE) membrane was prepared as follows. A blend of a high molecular weight polytetrafluoroethylene fine powder and a lower molecular weight modified polytetrafluoroethylene polymer was prepared in accordance with the teachings of U.S. Pat. No. 5,814,405 to Branca, et al. and then combined with 0.244 lb/lb of lubricant (Isopar™ K, Exxon, Houston, Tex.). The resultant mixture was then blended, compressed into a cylindrical pellet, and thermally conditioned for 18 hours at a temperature of 25° C. The cylindrical pellet was then extruded through a rectangular orifice die at a reduction ratio of 47:1 to form a tape. The tape was then calendered between rolls at the calendering ratio of 14.39:1 to form the first PTFE membrane.

A second PTFE membrane was prepared as follows: A fine powder of polytetrafluoroethylene polymer made in accordance with the teachings of U.S. Pat. No. 4,576,869 to Malhotra, et al. was combined with 0.21 lb/lb of lubricant (Isopar™ K, Exxon, Houston, Tex.). The resultant mixture was then blended, compressed into a cylindrical pellet, and thermally conditioned for 8 hours at a temperature of 49° C. The cylindrical pellet was then extruded through a rectangular orifice die at a reduction ratio of 81:1 to form a tape. The tape was then calendered between rolls at a calendering ratio of 3:1. The calendered tape was then transversely stretched at a ratio of 3.6:1 and dried at a temperature of 220° C. The width of the resulting second PTFE membrane was trimmed to match the width of the first PTFE membrane to facilitate the layering process described below.

The first PTFE membrane was layered on the second PTFE membrane and the layered product was calendered between rolls and reduced in thickness by 36.4%. The resultant layered laminate was dried at a temperature of 250° C. to remove the lubricant. The dried laminate was then expanded at 300° C. in the y-direction at an average engineering strain rate of 2.26%/second and a stretch amount equal to 60%. The resulting material was subsequently expanded in the x-direction at an average engineering strain rate of 19%/second, at a temperature of about 330° C. and a stretch amount equal to 761%. The material was then sintered at 360° C. for not more than 60 seconds.

Figure 2:
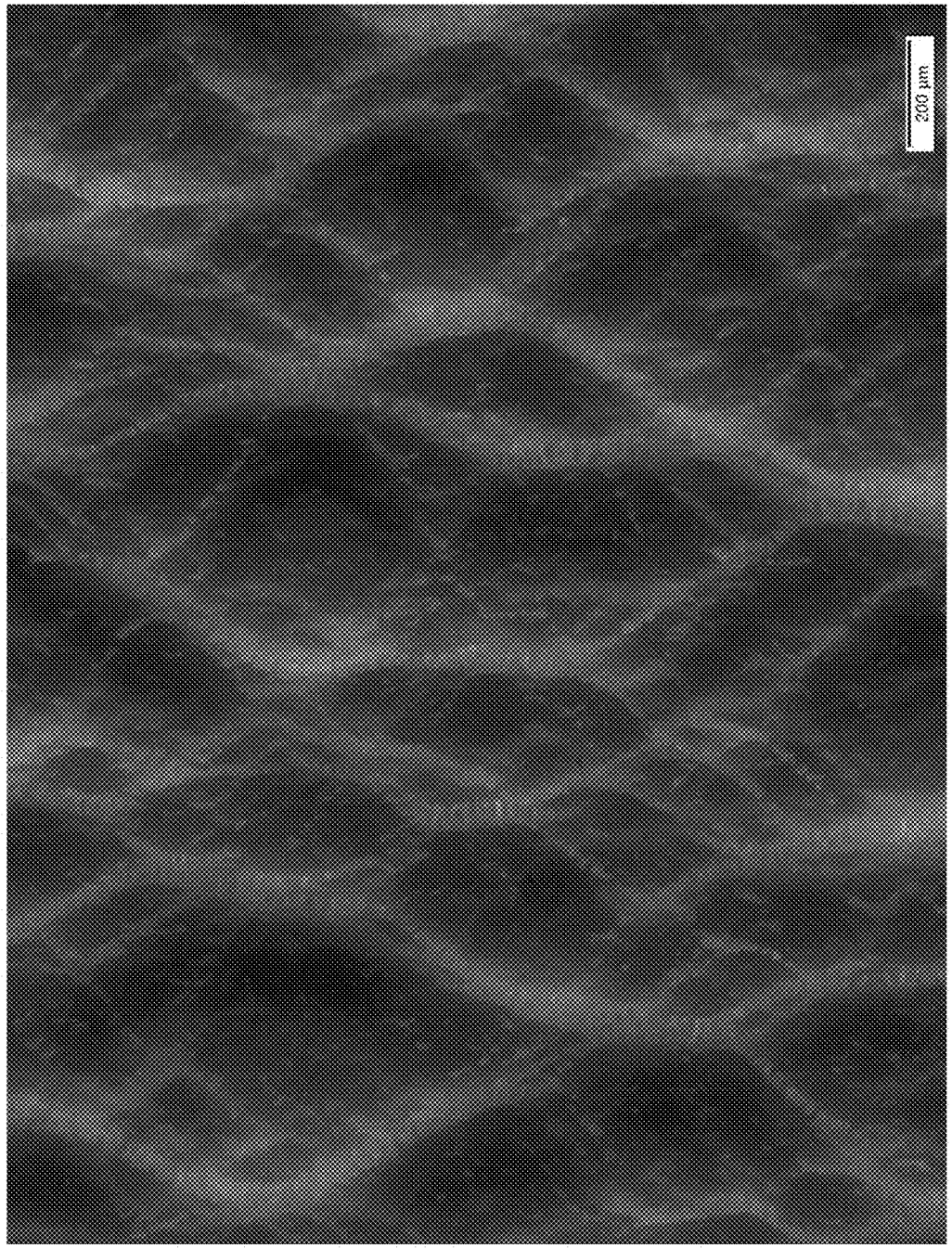
FIG. 2 is an optical microscopic image of the surface of the first PTFE membrane in the composite article of Example 1 taken at 32× according to an embodiment of the invention.
Figure 2A:
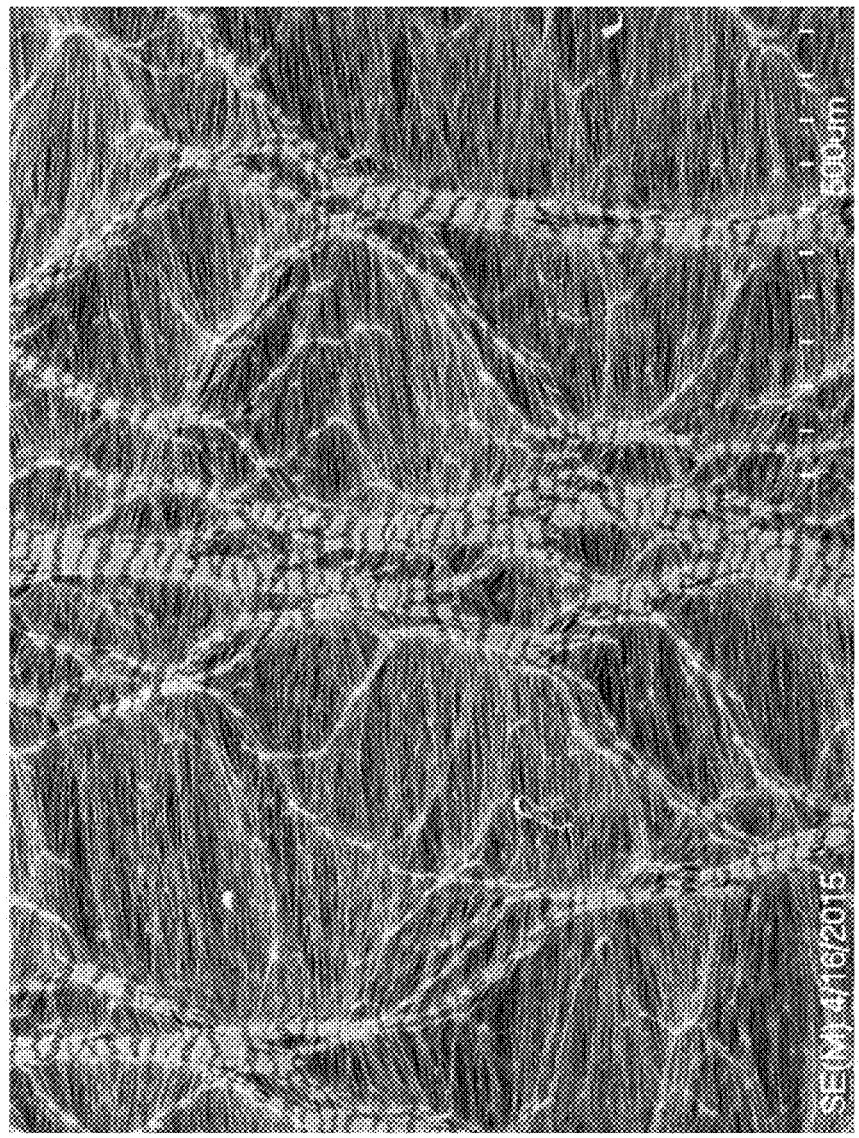
FIG. 2A is a scanning electron micrograph of the surface of the first PTFE membrane in the composite article of Example 1 taken at 100× according to at least one embodiment of the invention.

The resultant composite article had a first surface and a second surface, representative of the first and second PTFE membranes, respectively, as described above. An optical microscopic image of the first surface of the composite article taken at 7× is shown in FIG. 1. An optical microscopic image of the first surface of the composite article taken at 32× is shown in FIG. 2. FIGS. 1 and 2 show the strands of interconnected nodes forming a visible pattern on the first surface (i.e., the first PTFE membrane) of the composite article. FIG. 2A is a scanning electron micrograph (SEM) of the surface of the first PTFE membrane in the composite article taken at 100× which shows the interconnected nodes forming the strands.

The composite article had a bulk density of 0.24 g/cc. The bubble point was measured using the run setting BP_9-50 psi. Two test conditions were run. In the first test, the PTFE membrane of the composite article was facing the metal plate. In the second test, the second PTFE membrane of the composite article facing the metal plate. The bubble point was measured to be 19.89 psi and 18.91, respectively.

Example 2

A first polytetrafluoroethylene (PTFE) membrane was prepared as follows. A blend of a high molecular weight polytetrafluoroethylene fine powder and a lower molecular weight modified polytetrafluoroethylene polymer was prepared in accordance with the teachings of U.S. Pat. No. 5,814,405 to Branca, et al. and then combined with 0.244 lb/lb of lubricant (Isopar™ K, Exxon, Houston, Tex.). The resultant mixture was then blended, compressed into a cylindrical pellet, and thermally conditioned for 18 hours at a temperature of 25° C. The cylindrical pellet was then extruded through a rectangular orifice die at a reduction ratio of 47:1 to form a tape. The tape was then calendered between rolls at a calendering ratio of 2.97:1 to form the first PTFE membrane.

A second PTFE membrane was prepared as follows. A fine powder of polytetrafluoroethylene polymer made in accordance with the teachings of U.S. Pat. No. 4,576,869 to Malhotra, et al. was combined with 0.21 lb/lb of lubricant (Isopar™ K, Exxon, Houston, Tex.) The resultant mixture was then blended, compressed into a cylindrical pellet, and thermally conditioned for 8 hours at a temperature of 49° C. The cylindrical pellet was then extruded through a die at a reduction ratio of 84:1 to form a tape. The tape was then calendered between rolls at a calendering ratio of 3:1. The calendered tape was then transversely stretched at a ratio of 3.6:1 and dried at a temperature of 220° C. The width of the resulting second PTFE membrane was trimmed to match the width of the first PTFE membrane to facilitate the layering process described below.

The first PTFE membrane was layered on the second PTFE membrane and the layered product was calendered between rolls and reduced in thickness by 3.5%. The resultant layered laminate was dried at a temperature of 250° C. to remove the lubricant. The dried laminate was then expanded at 300° C. in the y-direction at an average engineering strain rate of 2.26%/second and a stretch amount equal to 60%. The resulting material was subsequently expanded in the x-direction at an average engineering strain rate of 19.33%/second, at a temperature of about 300° C., and a stretch amount equal to 761%. The material was then sintered at 390° C. for not more than 60 seconds.

Figure 3:
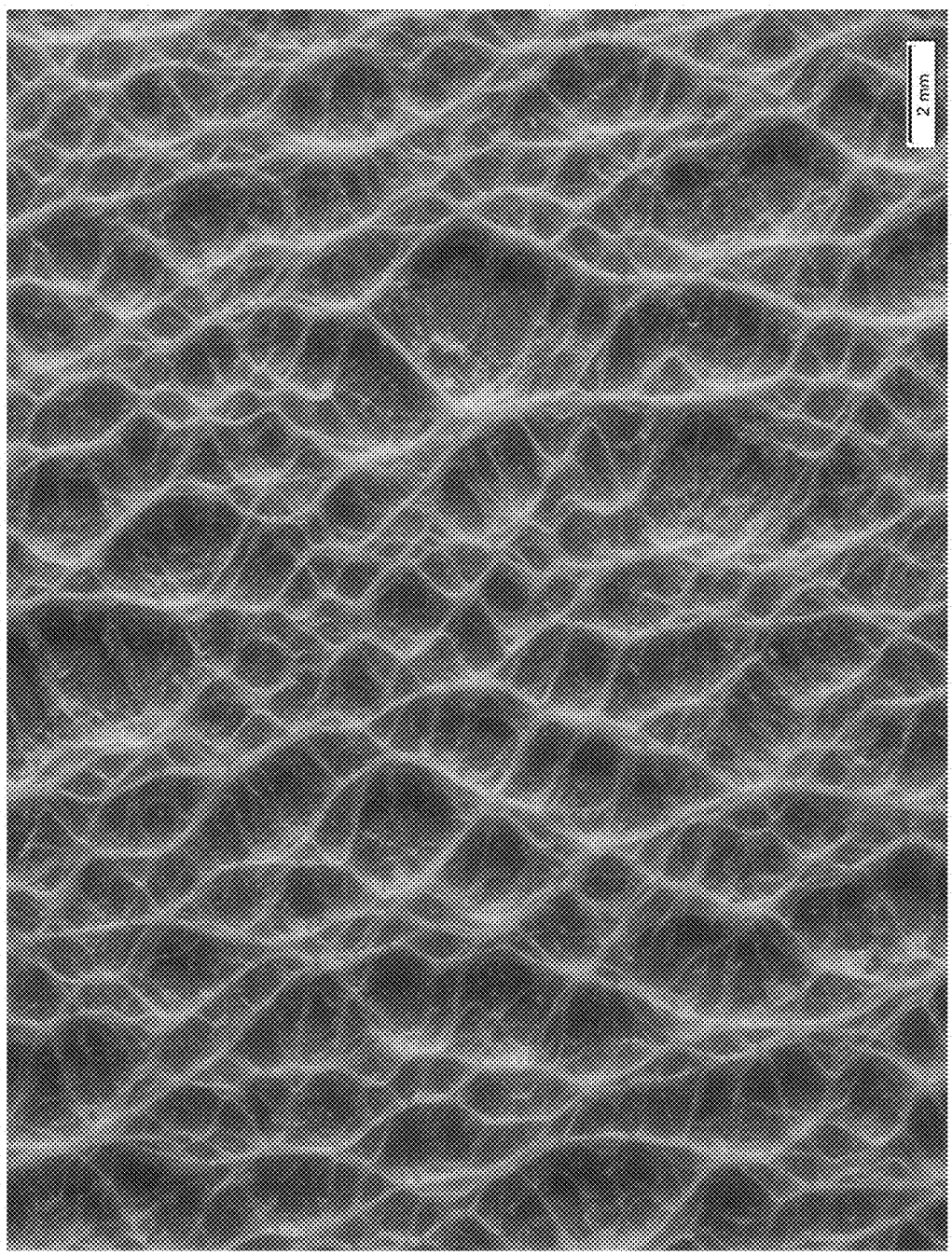
FIG. 3 is an optical microscopic image of the surface of the first PTFE membrane in the composite article of Example 2 taken at 7× in accordance with an embodiment of the invention.
Figure 4:
FIG. 4 is an optical microscopic image of the surface of the first PTFE membrane in the composite article of Example 2 taken at 32× in accordance with an embodiment of the invention.
Figure 4A:
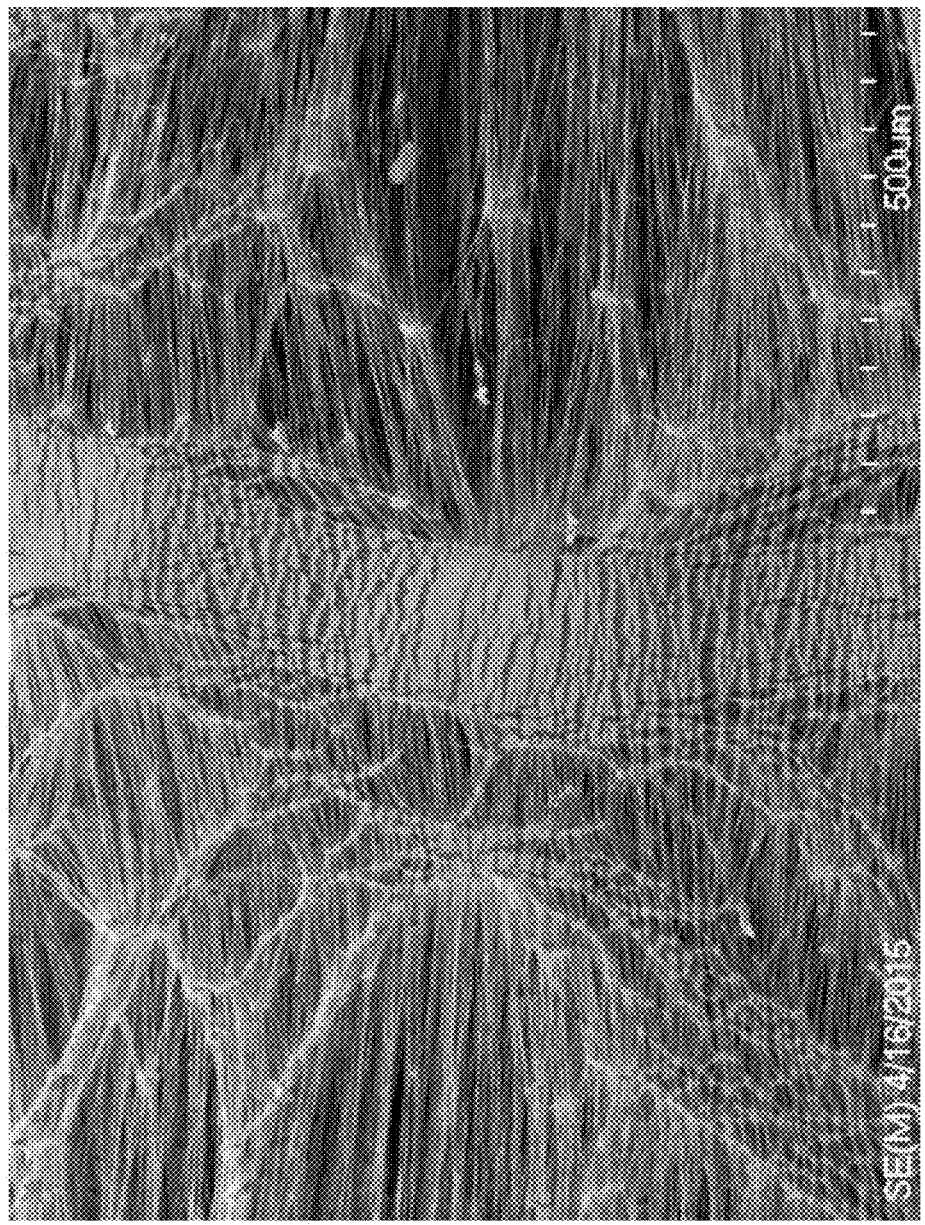
FIG. 4A is a scanning electron micrograph of the surface of the first PTFE membrane in the composite article of Example 2 taken at 100× according to at least one embodiment of the invention.

The resultant composite article had a first surface and a second surface, representative of the first and second PTFE membranes, respectively, as described above. An optical microscopic image of the first surface of the composite article taken at 7× is shown in FIG. 3. An optical microscopic image of the first surface of the composite article taken at 32× is shown in FIG. 4. FIGS. 3 and 4 show the strands of interconnected nodes forming a visible pattern on the first surface (i.e., the first PTFE membrane) of the composite article. FIG. 4A is a scanning electron micrograph (SEM) of the surface of the first PTFE membrane in the composite article taken at 100× which shows the interconnected nodes forming the strands.

The composite article had a bulk density of 0.14 g/cc. The bubble point was measured using the run setting: BP_9-50 psi. Two test conditions were run. In the first test, the first PTFE membrane of the composite article was facing the metal plate. In the second test, the second PTFE membrane of the composite article was facing the metal plate. The bubble point was measured to be 21.03 psi and 23.97 psi, respectively.

Example 3

A first polytetrafluoroethylene (PTFE) membrane was prepared as follows. A blend of a high molecular weight polytetrafluoroethylene fine powder and a lower molecular weight modified polytetrafluoroethylene polymer was prepared in accordance with the teachings of U.S. Pat. No. 5,814,405 to Branca, et al. and then combined with 0.244 lb/lb of lubricant (Isopar™ K, Exxon, Houston, Tex.). The resultant mixture was then blended, compressed into a cylindrical pellet, and thermally conditioned for 18 hours at a temperature of 25° C. The cylindrical pellet was then extruded through a rectangular orifice to form a tape. The tape was then calendered between rolls at a calendering ratio of 3.74:1 to form the first PTFE membrane.

A second PTFE membrane was prepared as follows. A fine powder of polytetrafluoroethylene polymer made in accordance with the teachings of U.S. Pat. No. 4,576,869 to Malhotra, et al. was combined with 0.21 lb/lb of lubricant (Isopar™ K, Exxon, Houston, Tex.). The resultant mixture was then blended, compressed into a cylindrical pellet, and thermally conditioned for 8 hours at a temperature of 49° C. The cylindrical pellet was then extruded through a die at a reduction ratio of 84:1 to form a tape. The tape was then calendered between rolls at a calendering ratio of 3:1. The calendered tape was then transversely stretched at a ratio of 3.6:1 and dried at a temperature of 220° C. The width of the resulting second PTFE membrane was trimmed to match the width of the first PTFE membrane to facilitate the layering process described below.

The first PTFE membrane was layered on the second PTFE membrane and the layered product was reduced in thickness by 20.1%. The resultant layered laminate was then dried at a temperature of 250° C. to remove the lubricant. The dried laminate was then expanded at 300° C. in the y-direction at an average engineering strain rate of 3.33%/sec and a stretch amount equal to 85%. The resulting material was subsequently expanded in the x-direction at an average engineering strain rate of 19.33%/second, at temperature of about 300° C. and a stretch amount equal to 761%. The material was then sintered at 390° C. for not more than 60 seconds.

Figure 5:
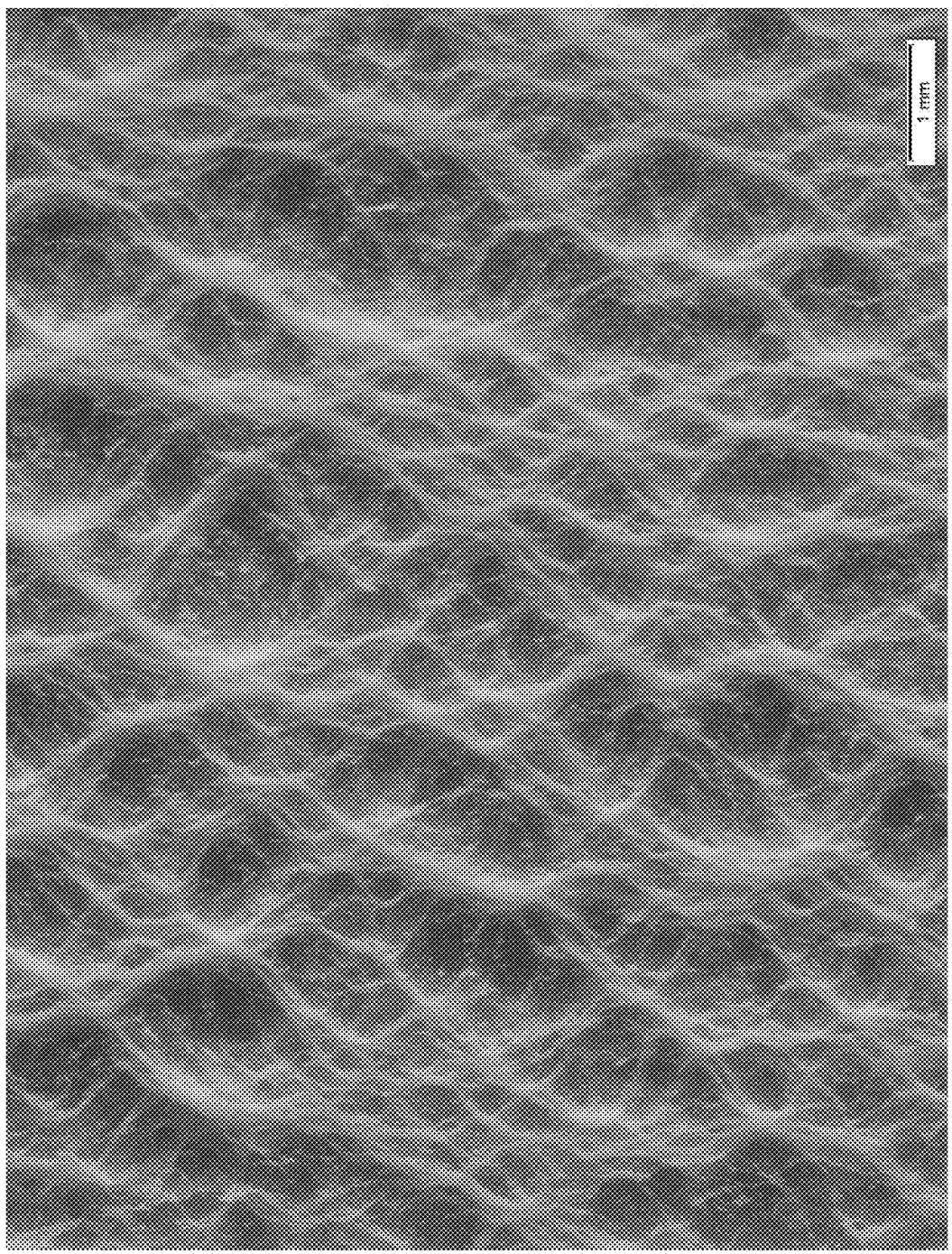
FIG. 5 is an optical microscopic image of the surface of the first PTFE membrane in the composite article of Example 3 taken at 7× in accordance with an embodiment of the invention.
Figure 6:
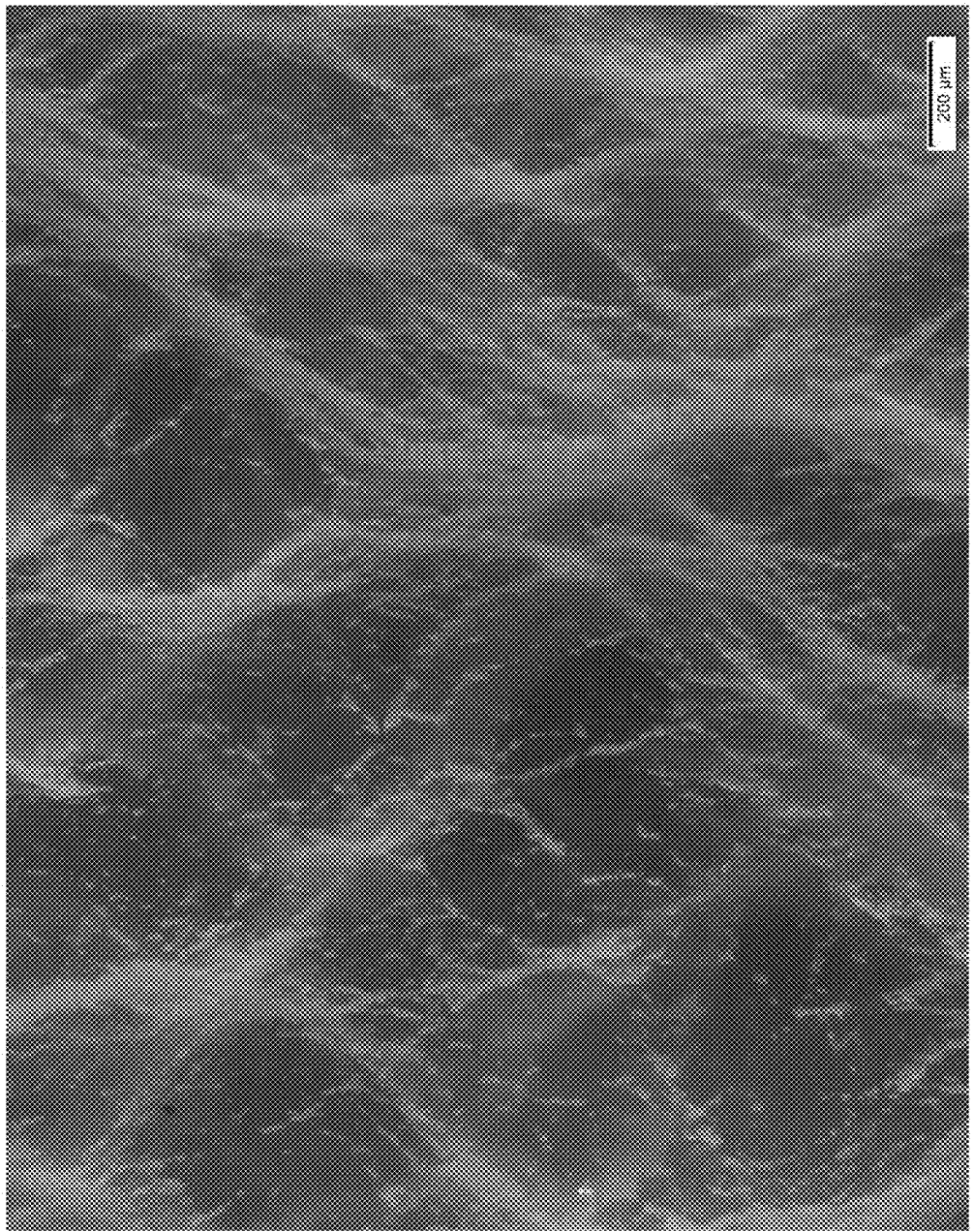
FIG. 6 is an optical microscopic image of the surface of the first PTFE membrane in the composite article of Example 3 taken at 32× in accordance with an embodiment of the invention.
Figure 6A:
FIG. 6A is a scanning electron micrograph of the surface of the first PTFE membrane in the composite article of Example 3 taken at 100× according to at least one embodiment of the invention.

The resultant composite article had a first surface and a second surface, representative of the first and second PTFE membranes, respectively, as described above. An optical microscopic image of the first surface of the composite article taken at 7× is shown in FIG. 5. An optical microscopic image of the first surface of the composite article taken at 32× is shown in FIG. 6. FIGS. 5 and 6 show the strands of interconnected nodes forming a visible pattern on the first surface (i.e., the first PTFE membrane) of the composite article. FIG. 6A is a scanning electron micrograph (SEM) of the surface of the first PTFE membrane in the composite article taken at 100× which shows the interconnected nodes forming the strands.

The composite article had a bulk density of 0.15 g/cc. The bubble point was measured using the run setting BP_9-50 psi. Two test conditions were run. In the first test, the first PTFE membrane the composite article was facing the metal plate. In the second test, the second PTFE membrane of the composite article was facing the metal plate. The bubble point was measured to be 35.05 psi and 45.16, respectively.

Example 4

A first polytetrafluoroethylene (PTFE) membrane was prepared as follows. A blend of a high molecular weight polytetrafluoroethylene fine powder and a lower molecular weight modified polytetrafluoroethylene polymer was prepared in accordance with the teachings of U.S. Pat. No. 5,814,405 to Branca, et al. and then combined with 0.259 lb/lb of lubricant (Isopar™ K, Exxon, Houston, Tex.). The resultant mixture was then blended, compressed into a cylindrical pellet, and thermally conditioned for 18 hours at a temperature of 25° C. The cylindrical pellet was then extruded through a rectangular orifice die at a reduction ratio of 47:1 to form a tape. The tape was then calendered between rolls at a calendering ratio of 15.9:1 to form the first PTFE membrane.

A second PTFE membrane was prepared as follows. A fine powder of polytetrafluoroethylene polymer made in accordance with the teachings of U.S. Pat. No. 6,541,589 to Baillie was combined with 0.185 lb/lb of lubricant (Isopar™ K, Exxon, Houston, Tex.). The resultant mixture was then blended, compressed into a cylindrical pellet, and thermally conditioned for 8 hours at a temperature of 49° C. The cylindrical pellet was then extruded through a rectangular orifice die at a reduction ratio of 87:1 to form a tape. The tape was then calendered between rolls at a calendering ratio of 3.9:1. The calendered tape was then transversely stretched at a ratio of 2.8:1 and dried at a temperature of 210° C. The width of the resulting second PTFE membrane was trimmed to match the width of the first PTFE membrane to facilitate the layering process described below.

The first PTFE membrane was layered on the second PTFE membrane and the layered product was reduced in thickness by 33.3%. The resultant layered laminate was then dried at a temperature of 210° C. to remove the lubricant. The dried laminate was then expanded at 300° C. in the y-direction between heated drums at an average engineering strain rate of 3.7%/sec and a stretch amount equal to 300%. The resulting material was subsequently expanded in the x-direction at an average engineering strain rate of 3.66%/second, at temperature of about 300° C., and a stretch amount equal to 162%. The material was then sintered at 390° C. for not more than 60 seconds.

Figure 7:
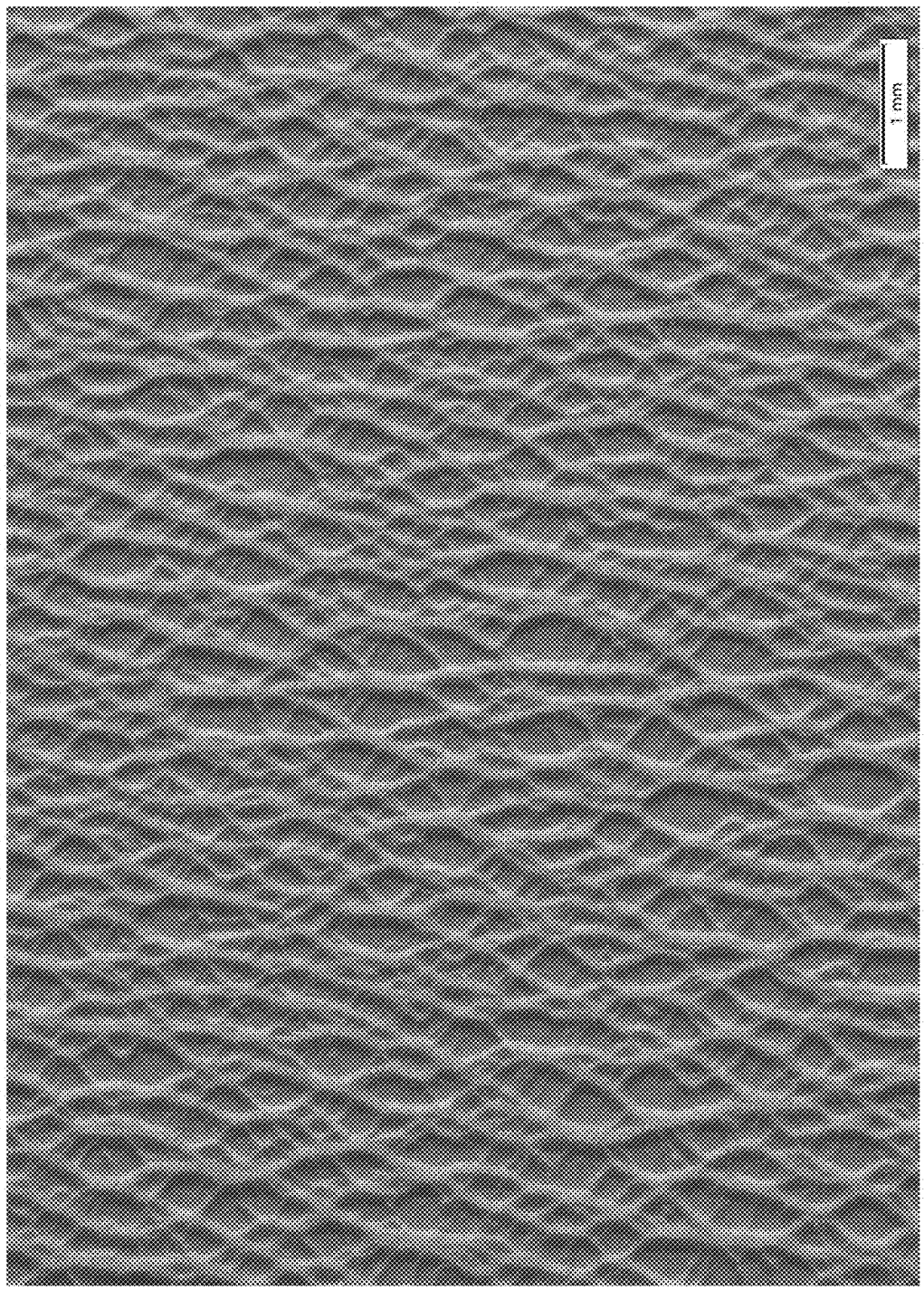
FIG. 7 is an optical microscopic image of the surface of the first PTFE membrane in the composite article of Example 4 taken at 7× in accordance with an embodiment of the invention.
Figure 8:
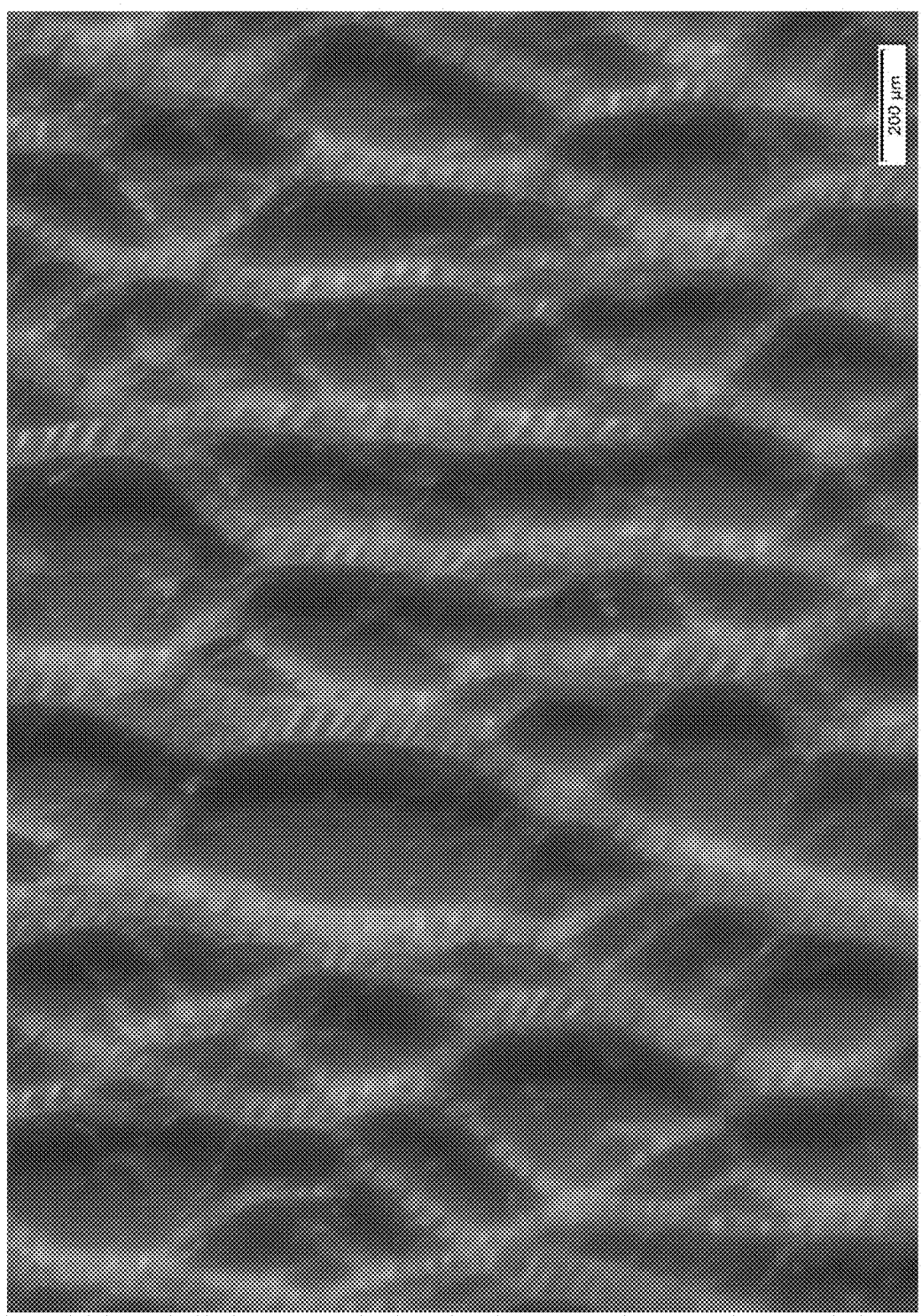
FIG. 8 is an optical microscopic image of the surface of the first PTFE membrane in the composite article of Example 4 taken at 32× in accordance with an embodiment of the invention.
Figure 8A:
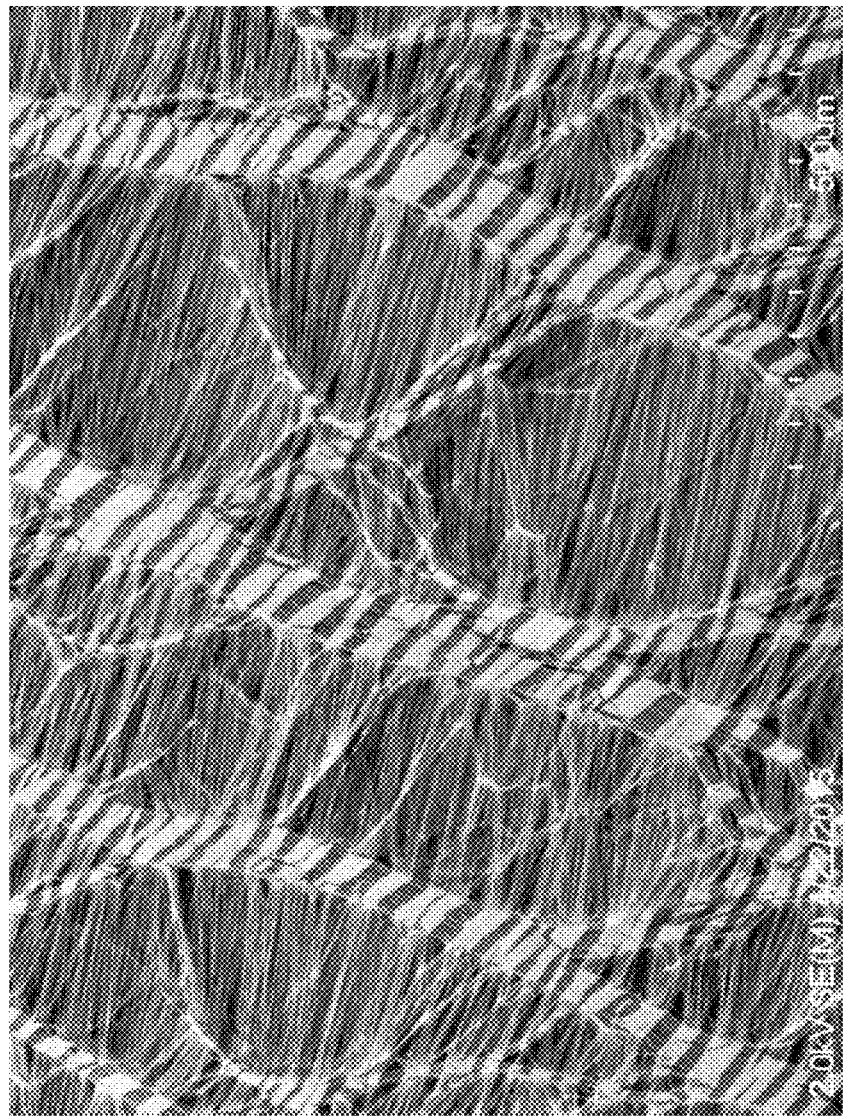
FIG. 8A is a scanning electron micrograph of the surface of the first PTFE membrane in the composite article of Example 4 taken at 100× according to at least one embodiment of the invention.

The resultant composite article had a first surface and a second surface, representative of the first and second PTFE membranes, respectively, as described above. An optical microscopic image of the first surface of the composite article taken at 7× is shown in FIG. 7. An optical microscopic image of the first surface of the composite article taken at 32× is shown in FIG. 8. FIGS. 7 and 8 show the strands of interconnected nodes forming a visible pattern on the first surface (i.e., the first PTFE membrane) of the composite article. FIG. 8A is a scanning electron micrograph (SEM) of the surface of the first PTFE membrane in the composite article taken at 100× which shows the interconnected nodes forming the strands.

The composite article had a bulk density of 0.43 g/cc. The bubble point was measured using the run setting BP_50-150 psi. Two test conditions were run. In the first test, the first PTFE membrane of the composite article was facing the metal plate. In the second test, the second PTFE membrane of the composite article was facing the metal plate. The bubble point was measured to be 78.10 psi and 81.58 respectively.

Example 5

A first polytetrafluoroethylene (PTFE) membrane was prepared as follows. A blend of a high molecular weight polytetrafluoroethylene fine powder and a lower molecular weight modified polytetrafluoroethylene polymer prepared in accordance with the teachings of U.S. Pat. No. 5,814,405 to Branca, et al. was combined with 0.259 lb/lb of lubricant (Isopar™ K, Exxon, Houston, Tex.). The resulting mixture was then blended, compressed into a cylindrical pellet, and thermally conditioned for 18 hours at a temperature of 25° C. The cylindrical pellet was then extruded through a rectangular orifice die at a reduction ratio of 47:1 to form a tape. The tape was then calendered between rolls at a calendering ratio of 4.97:1 to form the first PTFE membrane.

A second PTFE membrane was prepared as follows. A fine powder of polytetrafluoroethylene polymer made in accordance with the teachings of U.S. Pat. No. 6,541,589 to Baillie was combined with 0.185 lb/lb of lubricant (Isopar™ K, Exxon, Houston, Tex.). The resulting mixture was then blended, compressed into a cylindrical pellet, and thermally conditioned for 8 hours at a temperature of 49° C. The cylindrical pellet was then extruded through a rectangular orifice die at a reduction ratio of 87:1 to form a tape. The tape was then calendered between rolls at a calendering ratio of 3.9:1. The calendered tape was then transversely stretched at a ratio of 3.38:1 and dried at a temperature of 180° C. and 210° C. in a first and second oven, respectively, to form the second PTFE membrane.

The first PTFE membrane was layered on the second PTFE membrane and the layered product was reduced in thickness by 41.6%. The resultant layered laminate was then dried at a temperature of 210° C. to remove the lubricant. The dried laminate was then expanded at 300° C. in the y-direction between heated drums at an average engineering strain rate of 0.9%/sec and a stretch amount equal to 50%. The resulting material was subsequently expanded in the x-direction at an average engineering strain rate of 61%/second, at temperature of about 300° C., and a stretch amount equal to 1565%. The material was then sintered at 380° C. for not more than 60 seconds.

Figure 9:
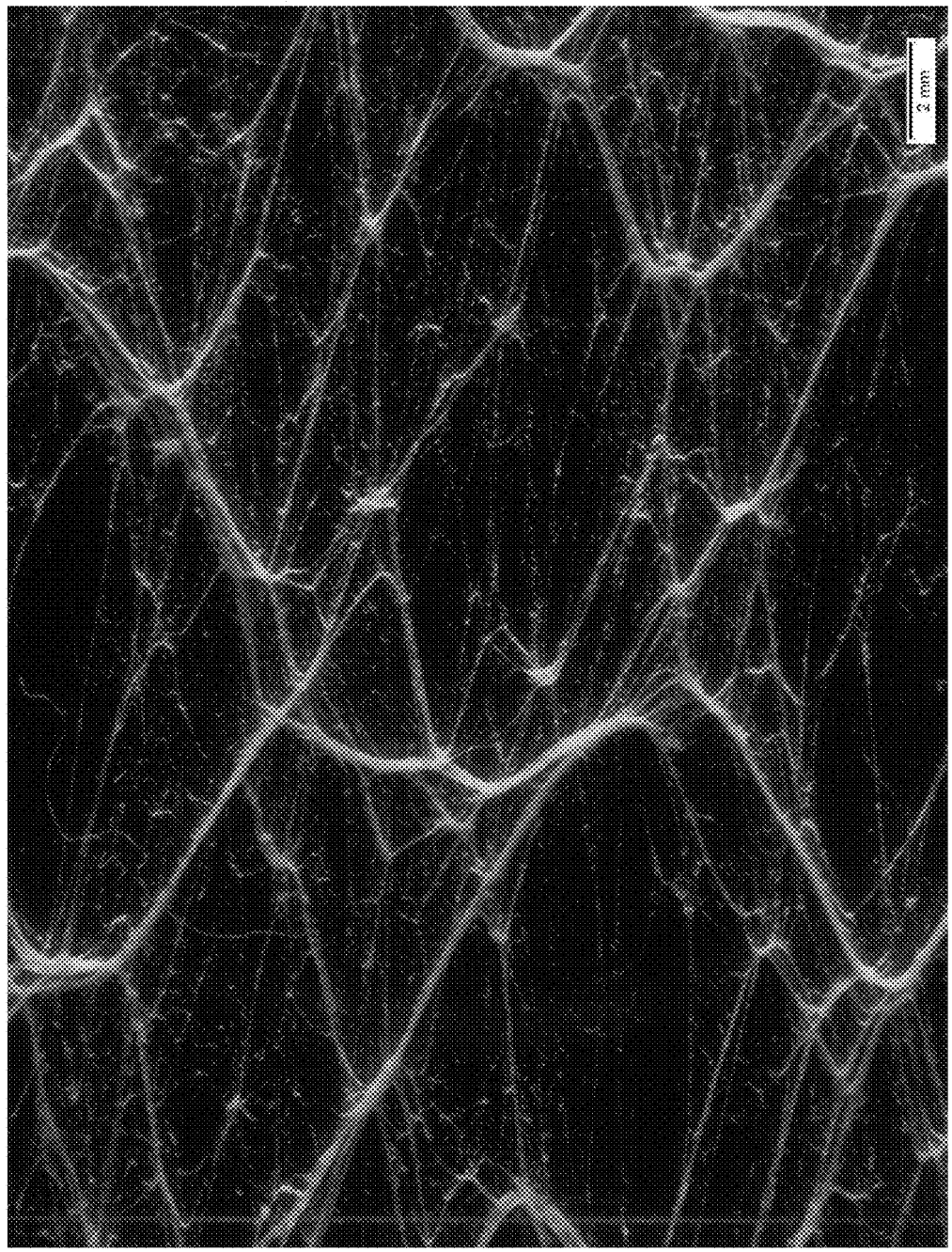
FIG. 9 is an optical microscopic image of the surface of the first PTFE membrane in the composite article of Example 5 taken at 7× in accordance with an embodiment of the invention.
Figure 10:
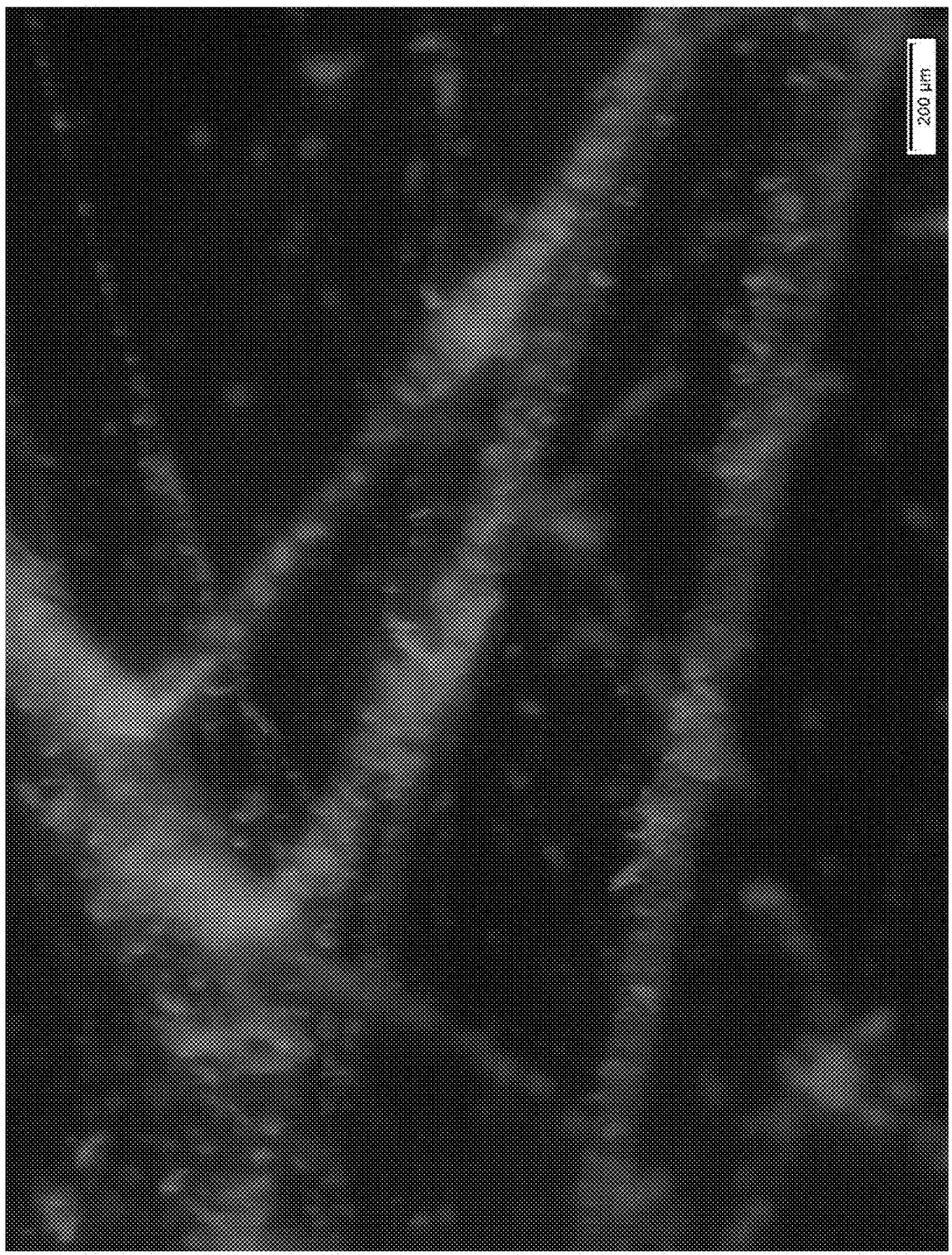
FIG. 10 is an optical microscopic image of the surface of the first PTFE membrane in the composite article of Example 5 taken at 32× in accordance with an embodiment of the invention.
Figure 10A:
FIG. 10A is a scanning electron micrograph of the surface of the first PTFE membrane in the composite article of Example 5 taken at 100× according to at least one embodiment of the invention.

The resultant composite article had a first surface and a second surface, representative of the first and second PTFE membranes, respectively, as described above. An optical microscopic image of the first surface of the composite article taken at 7× is shown in FIG. 9. An optical microscopic image of the first surface of the composite article taken at 32× is shown in FIG. 10. FIGS. 9 and 10 show the strands of interconnected nodes forming a visible pattern on the first surface (i.e., the first PTFE membrane) of the composite article. FIG. 10A is a scanning electron micrograph (SEM) of the surface of the first PTFE membrane in the composite article taken at 100× which shows the interconnected nodes forming the strands.

The composite article had a bulk density of 0.09 g/cc. The bubble point was measured using the run setting BP_50-120 psi. Two test conditions were run. In the first test, the first PTFE membrane of the composite article was facing the metal plate. In the second test, the second PTFE membrane of the composite article was facing the metal plate. The bubble point was measured to be 75.8 psi and 81.93 psi respectively.

Example 6

A first polytetrafluoroethylene (PTFE) membrane was prepared as follows. A fine powder of polytetrafluoroethylene polymer (Part Number: T62, DuPont., Parkersbury, W.Va.) was combined with 0.235 lb/lb of lubricant (Isopar™ K, Exxon, Houston, Tex.). The resultant mixture was then blended, compressed into a cylindrical pellet, and thermally conditioned for 8 hours at a temperature of 16° C. The cylindrical pellet was then extruded through a rectangular orifice die at a reduction ratio of 74:1 to form a tape. The tape was then calendered between rolls at a calendering ratio of 1.65:1 to form the first PTFE membrane.

A second PTFE membrane was prepared as follows. A fine powder of polytetrafluoroethylene polymer made in accordance with the teachings of U.S. Pat. No. 4,576,869 to Malhotra, et al. was combined with 0.226 lb/lb of lubricant (Isopar™ K, Exxon, Houston, Tex.). The resultant mixture was then blended, compressed into a cylindrical pellet, and thermally conditioned for 8 hours at a temperature of 49° C. The cylindrical pellet was then extruded through a die at a reduction ratio of 74:1 to form a tape. The tape was then calendered between rolls at a calendering ratio of 3.7:1 to form the second PTFE membrane.

The first PTFE membrane was layered on the second PTFE membrane and the layered product was reduced in thickness by 19%. The layered laminate was transversely stretched at a ratio of 3.6:1 and subsequently dried at a temperature of 250° C. to remove the lubricant. The dried laminate was then expanded at 300° C. in the y-direction between heated drums at an average engineering strain rate of 109%/sec and a stretch amount equal to 25%. The resulting material was subsequently expanded in the x-direction at an average engineering strain rate of 399%/second, a temperature of about 260° C., and a stretch amount equal to 467%. The material was then sintered at 373° C. for not more than 60 seconds.

Figure 11:
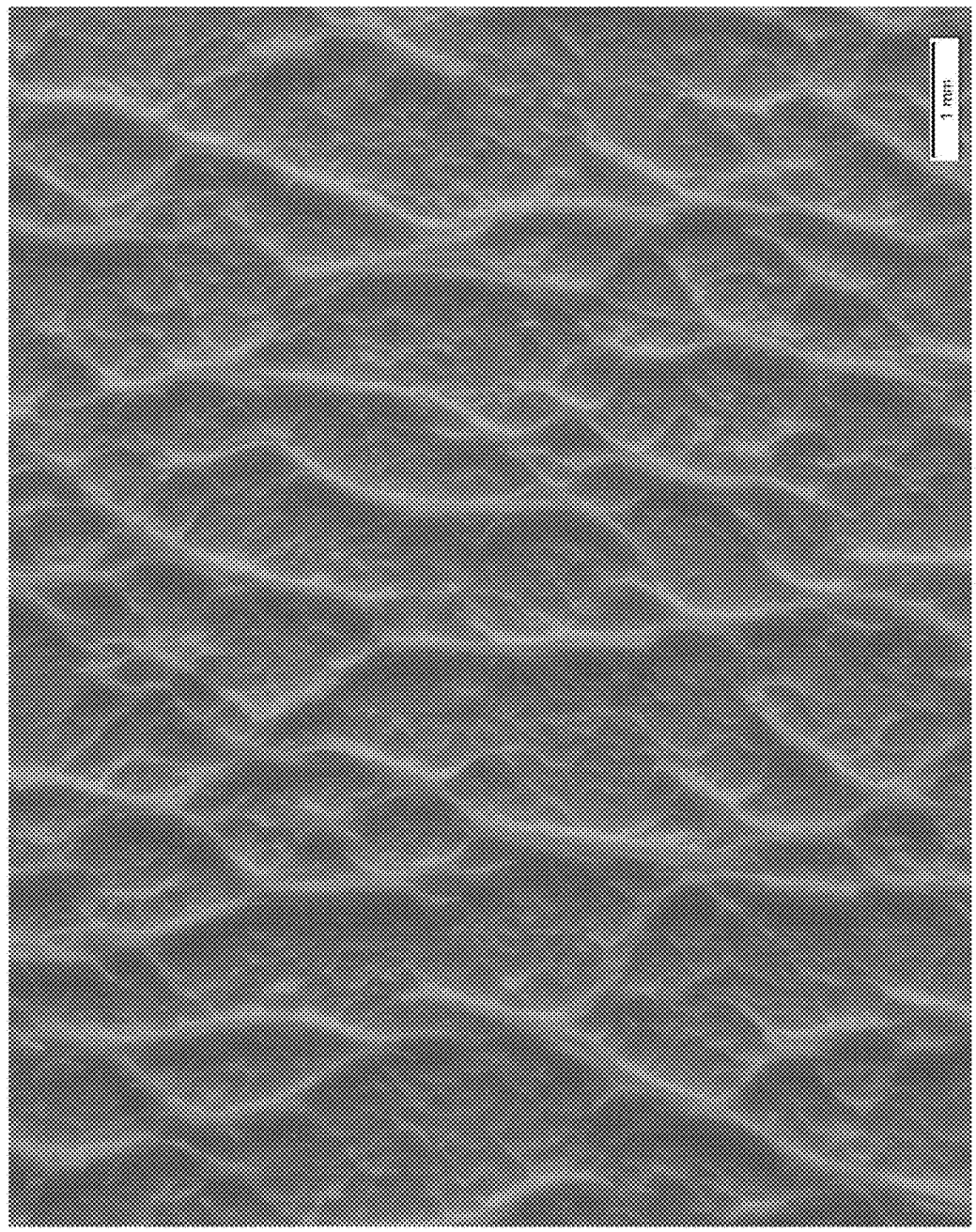
FIG. 11 is an optical microscopic image of the surface of the first PTFE membrane in the composite article of Example 6 taken at 7× in accordance with an embodiment of the invention.
Figure 12:
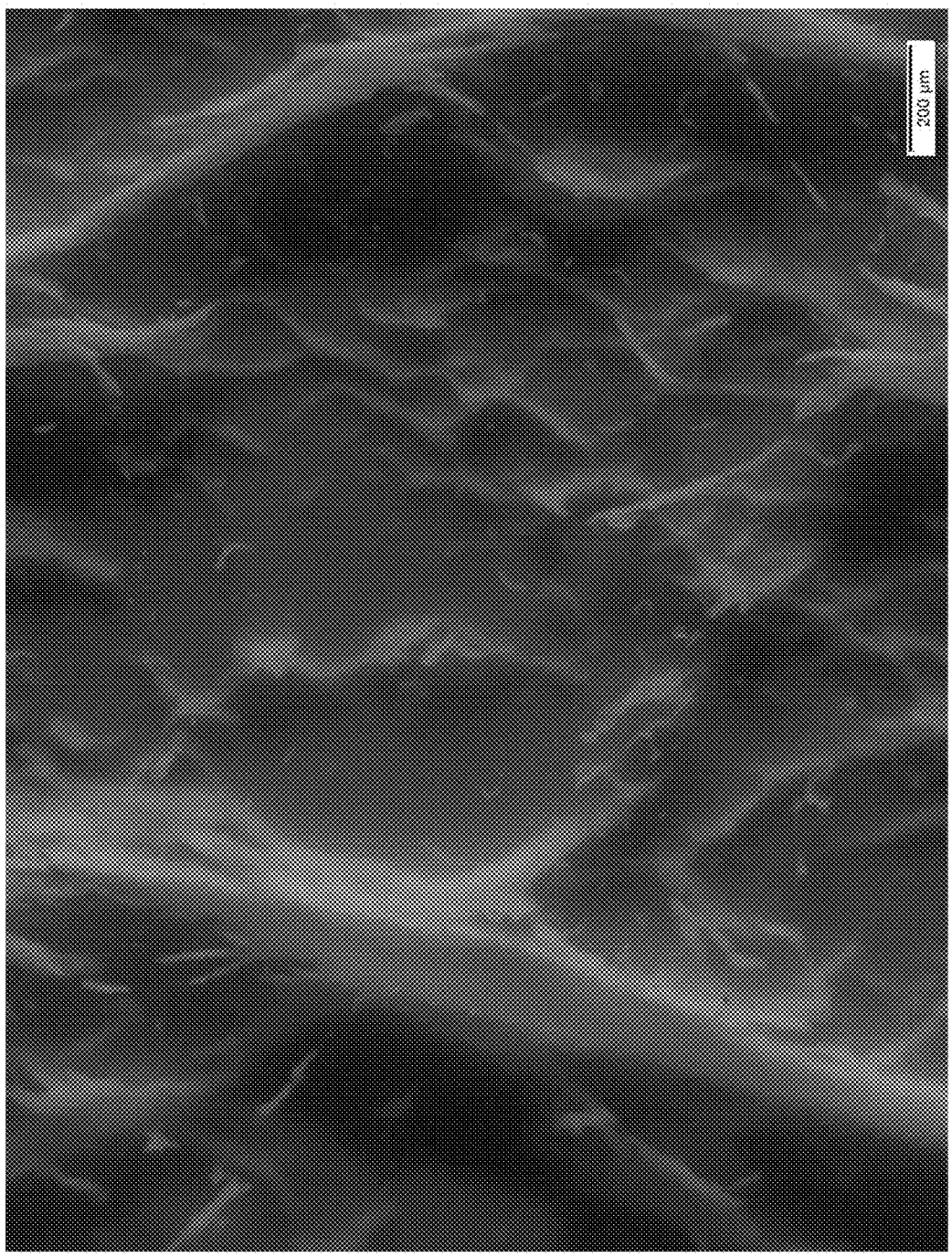
FIG. 12 is an optical microscopic image of the surface of the first PTFE membrane in the composite article of Example 6 taken at 32× in accordance with an embodiment of the invention.
Figure 12A:
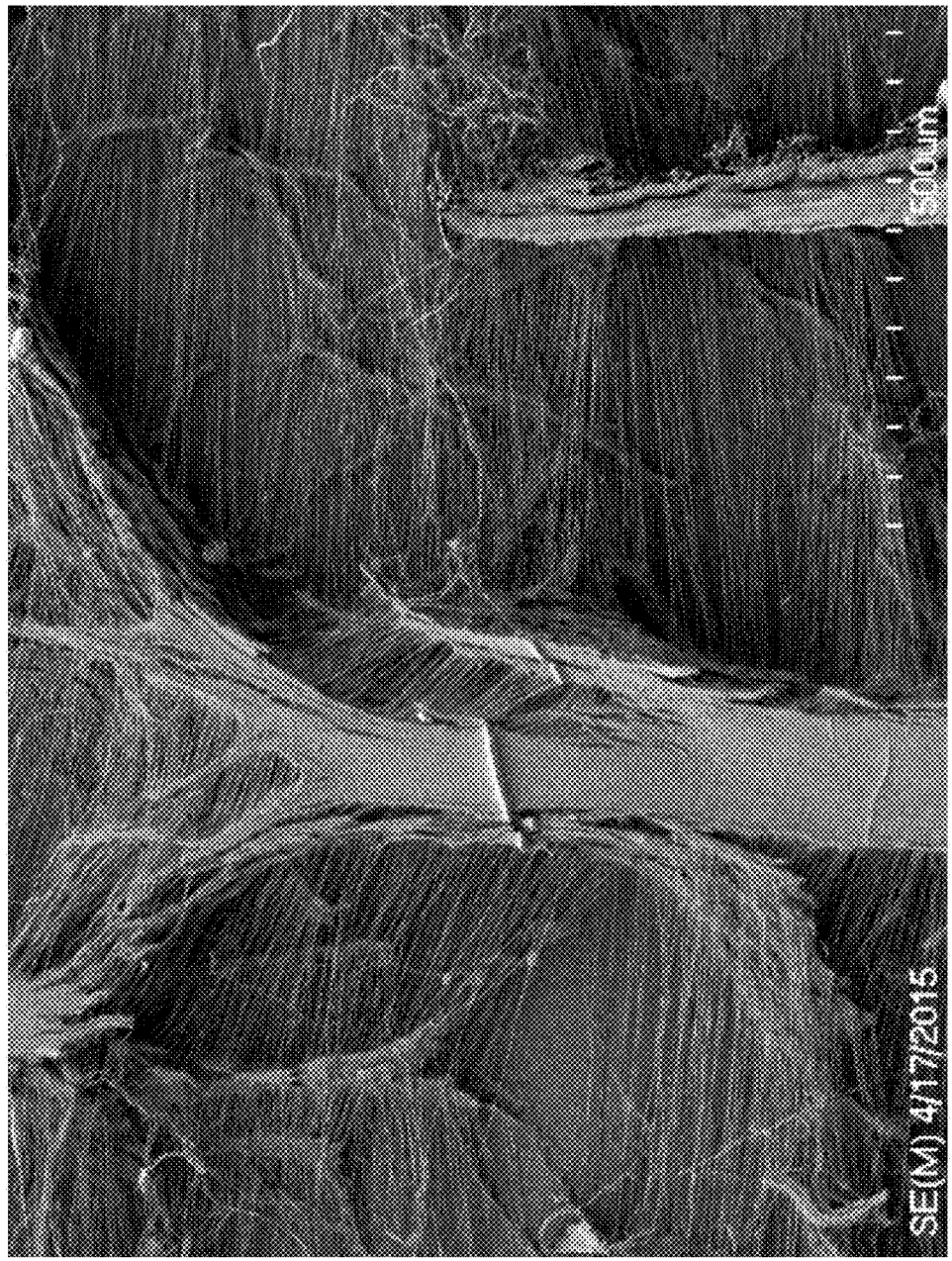
FIG. 12A is a scanning electron micrograph of the surface of the first PTFE membrane in the composite article of Example 6 taken at 100× according to at least one embodiment of the invention.

The resultant composite article had a first surface and a second surface, representative of the first and second PTFE membranes, respectively, as described above. An optical microscopic image of the first surface of the composite article taken at 7× is shown in FIG. 11. An optical microscopic image of the first surface of the composite article taken at 32× is shown in FIG. 12. FIGS. 11 and 12 show the strands of interconnected nodes forming a visible pattern on the first surface (i.e., the first PTFE membrane) of the composite article. FIG. 12A is a scanning electron micrograph (SEM) of the surface of the first PTFE membrane in the composite article taken at 100× which shows the interconnected nodes forming the strands.

The composite article had a thickness of 0.139 mm and a bulk density of 0.25 g/cc. The bubble point was measured using the run setting: BP_9-50 psi. Two test conditions were run. In the first test, the first PTFE membrane of the composite article was facing the metal plate. In the second test, the second PTFE membrane of the composite article was facing the metal plate. The bubble point was measured to be 23.64 psi and 24.29 psi, respectively.

Example 7

A first polytetrafluoroethylene (PTFE) membrane was prepared as follows. A fine powder of polytetrafluoroethylene polymer (Part Number: T62, DuPont., Parkersbury, W.Va.) was combined with 0.253 lb/lb of lubricant (Isopar™ K, Exxon, Houston, Tex.). The resultant mixture was then blended, compressed into a cylindrical pellet, and thermally conditioned for 8 hours at a temperature of 16° C. The cylindrical pellet was then extruded through a rectangular orifice die at a reduction ratio of 74:1 to form a tape. The tape was then calendered between rolls at a calendering ratio of 1.65:1 to form the first PTFE membrane.

A second PTFE membrane was prepared as follows. A fine powder of polytetrafluoroethylene polymer made in accordance with the teachings of U.S. Pat. No. 4,576,869 to Malhotra, et al. was combined with 0.226 lb/lb of lubricant (Isopar™ K, Exxon, Houston, Tex.). The resultant mixture was then blended, compressed into a cylindrical pellet, and thermally conditioned for 8 hours at a temperature of 49° C. The cylindrical pellet was then extruded through a rectangular orifice die at a reduction ratio of 74:1 to form a tape. The tape was then calendered between rolls at a calendering ratio of 3.7:1 to form the second PTFE membrane.

The first PTFE membrane was layered on the second PTFE membrane and the layered product was reduced in thickness by 50.8%. The layered laminate was transversely stretched at a ratio of 3.6:1 and then dried at a temperature of 250° C. to remove the lubricant. The dried laminate was then expanded at 300° C. in the y-direction between heated drums at an average engineering strain rate of 14%/sec and a stretch amount equal to 103%. The resulting material was subsequently expanded in the x-direction at an engineering strain rate of 273%/second, a temperature of 260° C., and a stretch amount equal to 467%. The material was then sintered at 373° C. for not more than 60 seconds.

Figure 14:
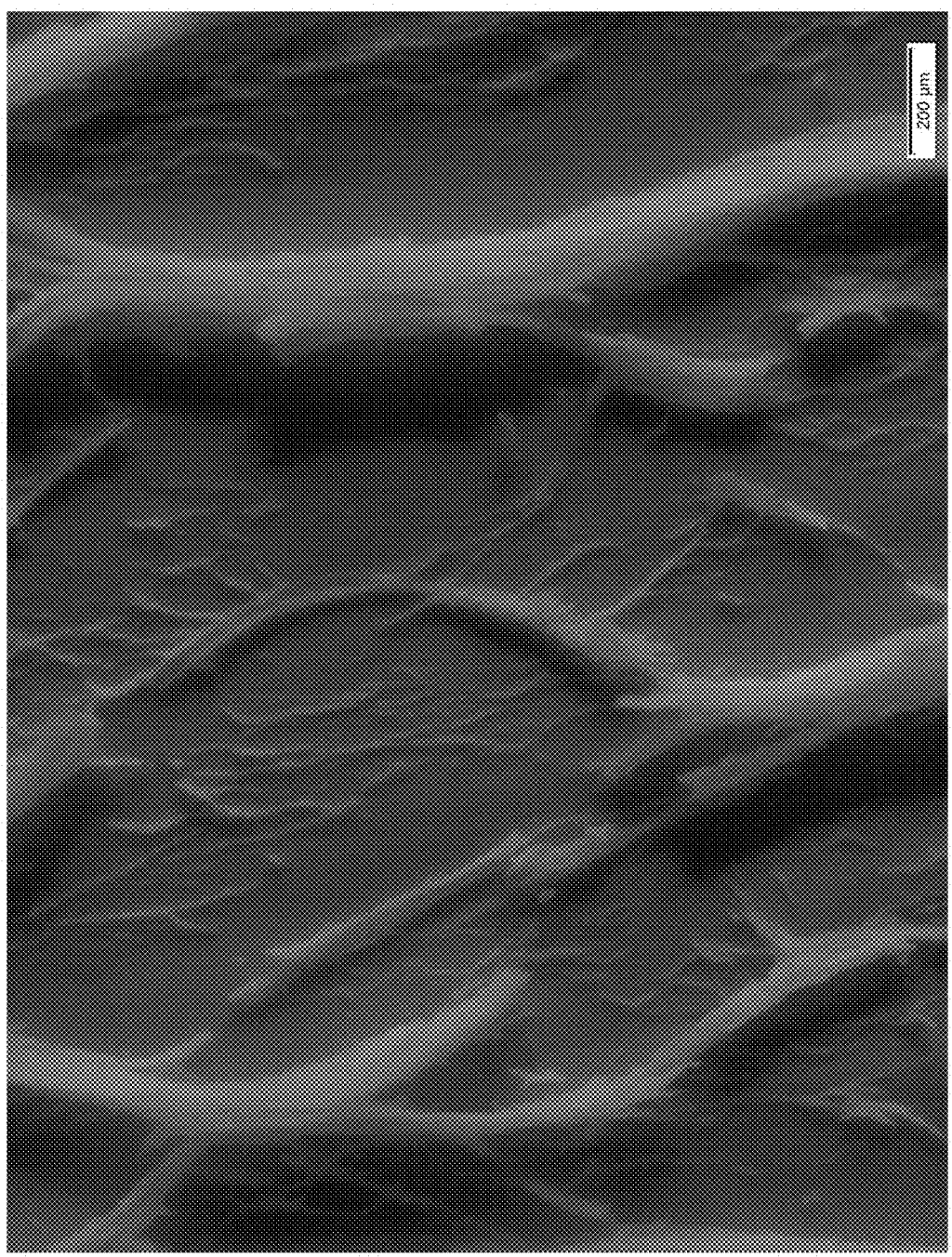
FIG. 14 is an optical microscopic image of the surface of the first PTFE membrane in the composite article of Example 7 taken at 32× in accordance with an embodiment of the invention.
Figure 14A:
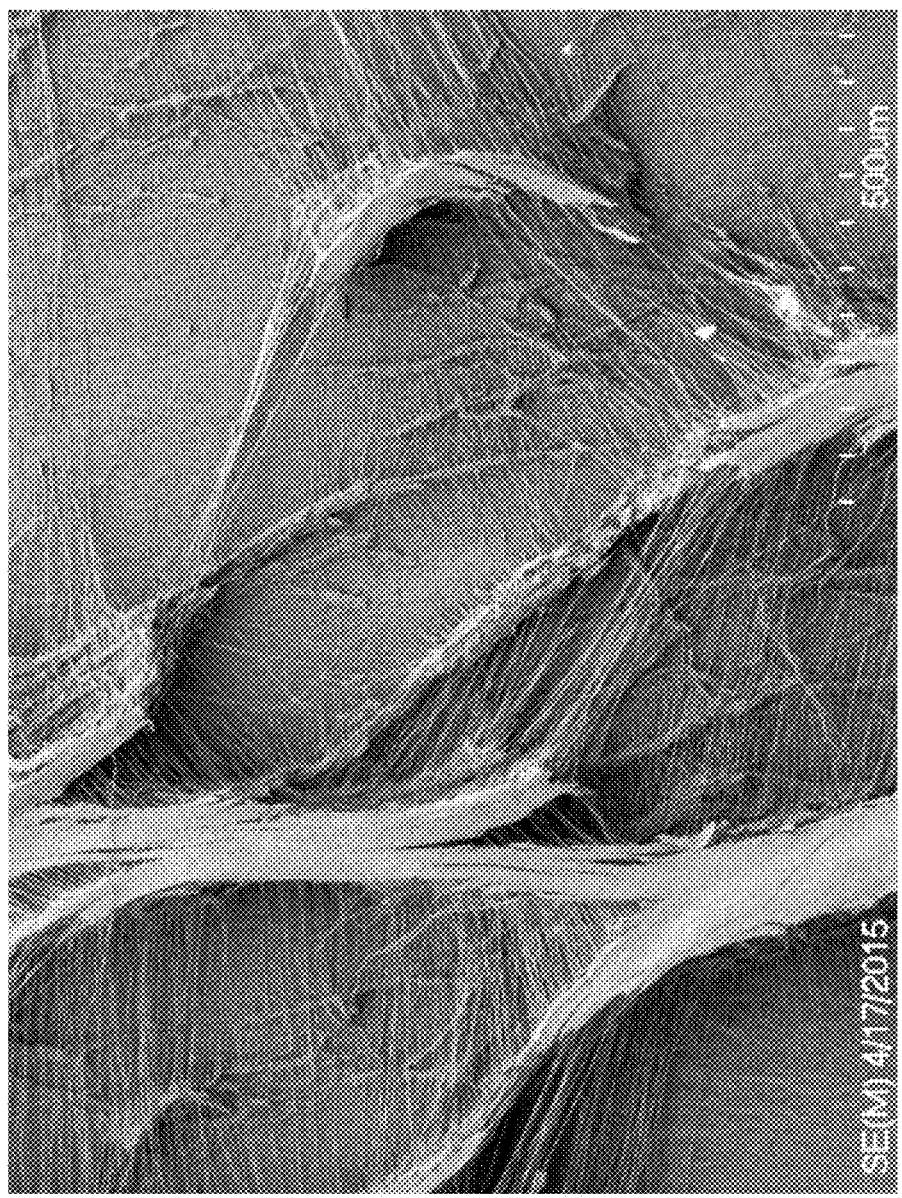
FIG. 14A is a scanning electron micrograph of the surface of the first PTFE membrane in the composite article of Example 7 taken at 100× according to at least one embodiment of the invention.

The resultant composite article had a first surface and a second surface, representative of the first and second PTFE membranes, respectively, as described above. An optical microscopic image of the first surface of the composite article taken at 7× is shown in FIG. 13. An optical microscopic image of the first surface of the composite article taken at 32× is shown in FIG. 14. FIGS. 13 and 14 show the strands of interconnected nodes forming a visible pattern on the first surface (i.e., the first PTFE membrane) of the composite article. FIG. 14A is a scanning electron micrograph (SEM) of the surface of the first PTFE membrane in the composite article taken at 100× which shows the interconnected nodes forming the strands.

The composite article had a thickness of 0.134 mm and a bulk density of 0.17 g/cc. The bubble point was measured using the run setting BP_9-50 psi. Two test conditions were run. In the first test, the first PTFE membrane of the composite article was facing the metal plate. In the second test, the second PTFE membrane of the composite article was facing the metal plate. The bubble point was measured to be 21.03 psi and 20.87 psi, respectively.

Example 8

A first polytetrafluoroethylene (PTFE) membrane was prepared as follows. A polytetrafluoroethylene polymer fine powder resin (Part Number: F104, Daikin., Ala.) was combined with 0.252 lb/lb of lubricant (Isopar™ K, Exxon, Houston, Tex.). The resultant mixture was then blended, compressed into a cylindrical pellet, and thermally conditioned for 8 hours at a temperature of 23° C. The cylindrical pellet was then extruded through a rectangular orifice die at a reduction ratio of 40:1 to form a tape. The tape was then calendered between rolls at a calendering ratio of 2.75:1 to form the first PTFE membrane.

A second PTFE membrane was prepared as follows. A polytetrafluoroethylene polymer fine powder made in accordance with the teachings of U.S. Pat. No. 4,576,869 to Malhotra, et al. was combined with 0.186 lb/lb of lubricant (Isopar™ K, Exxon, Houston, Tex.). The resultant mixture was then blended, compressed into a cylindrical pellet, and thermally conditioned for 8 hours at a temperature of 70° C. The cylindrical pellet was then extruded through a rectangular orifice die at a reduction ratio of 78:1 to form a tape. The tape was then calendered between rolls at a calendering ratio of 3.4:1 to form the second PTFE membrane.

The first PTFE membrane was layered on the second PTFE membrane and the layered product calendered between rolls. The resultant layered laminate was then dried at a temperature of 250° C. to remove the lubricant. The dried laminate was then expanded at 300° C. in the y-direction between heated drums at an average engineering strain rate of 99%/sec and a stretch amount equal to 30%. The resulting material was subsequently expanded in the x-direction at an average engineering strain rate of 228%/second, a temperature of about 300° C., and a stretch amount equal to 1600%. The material was then sintered at 380° C. for not more than 60 seconds.

Figure 15:
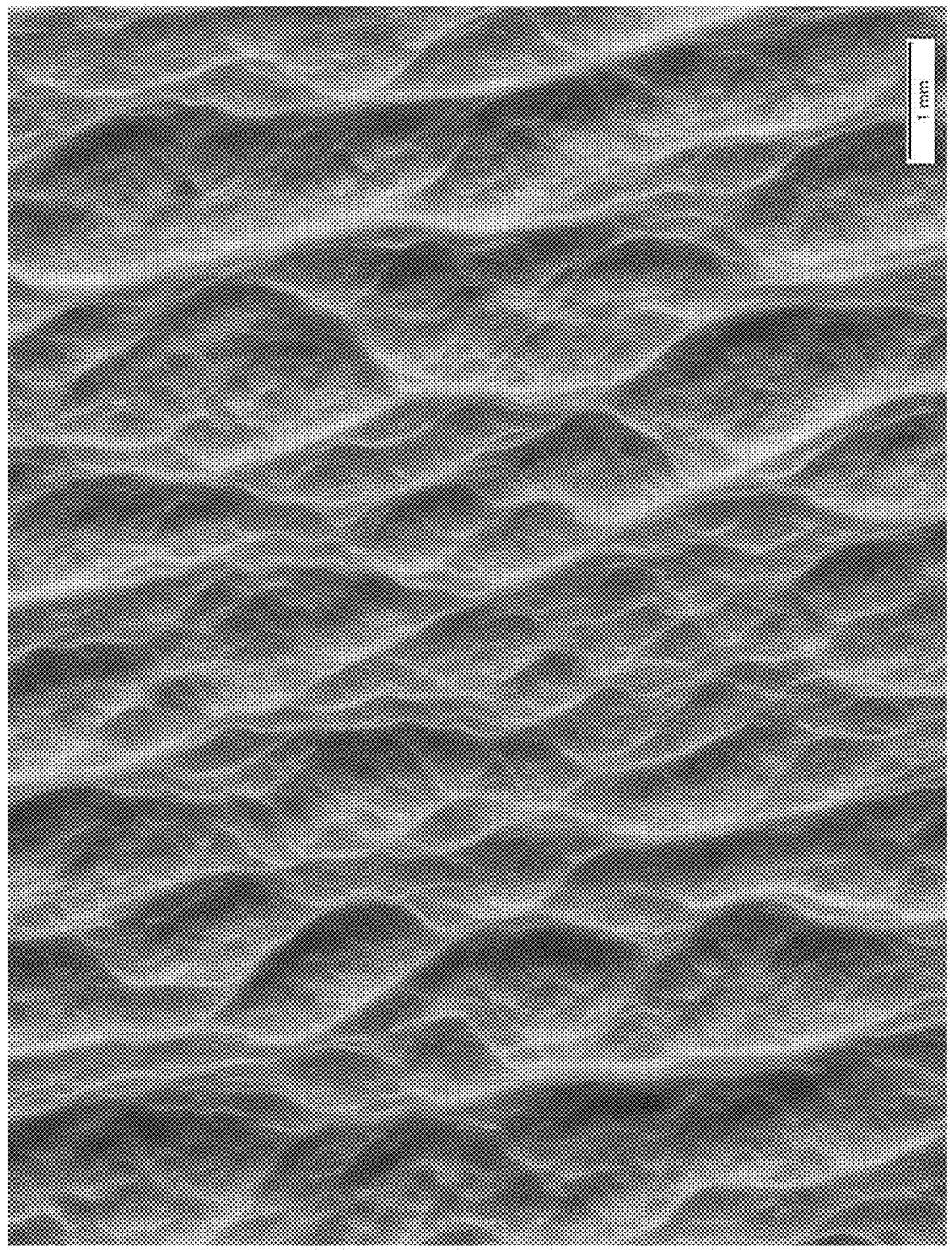
FIG. 15 is an optical microscopic image of the surface of the first PTFE membrane in the composite article of Example 8 taken at 7× in accordance with an embodiment of the invention.
Figure 16:
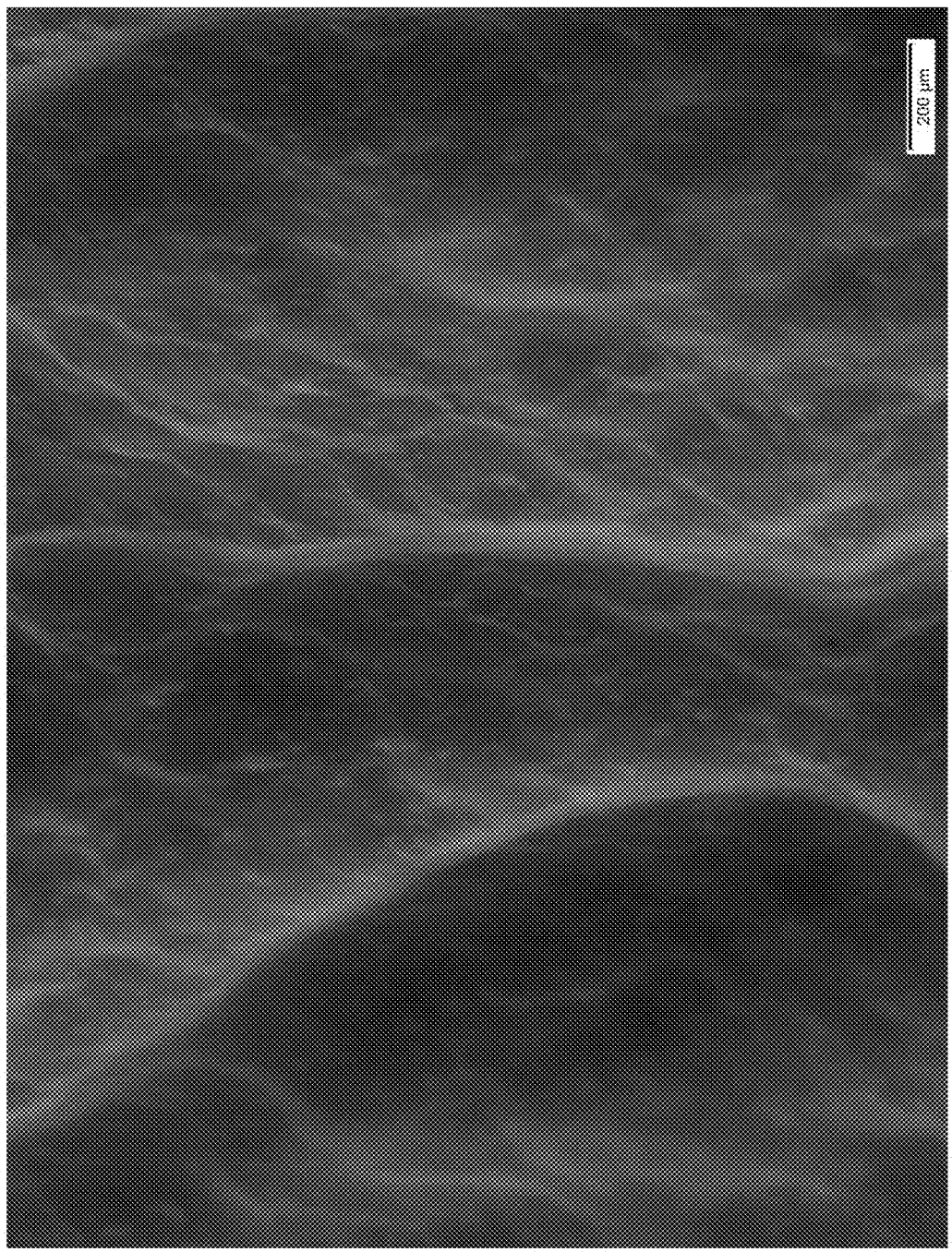
FIG. 16 is an optical microscopic image of the surface of the first PTFE membrane in the composite article of Example 8 taken at 32× in accordance with an embodiment of the invention.
Figure 16A:
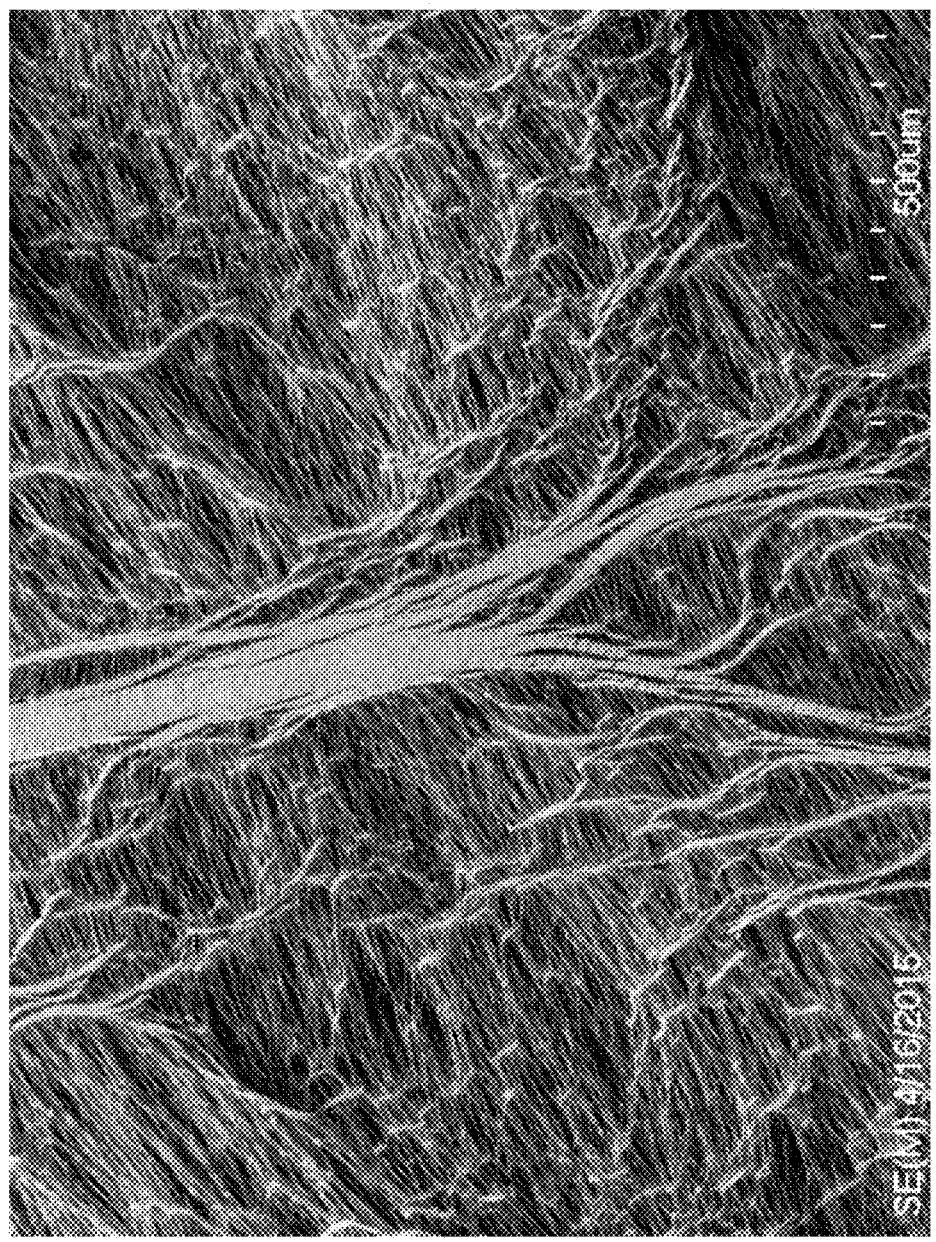
FIG. 16A is a scanning electron micrograph of the surface of the first PTFE membrane in the composite article of Example 8 taken at 100× according to at least one embodiment of the invention.
Figure 16B:
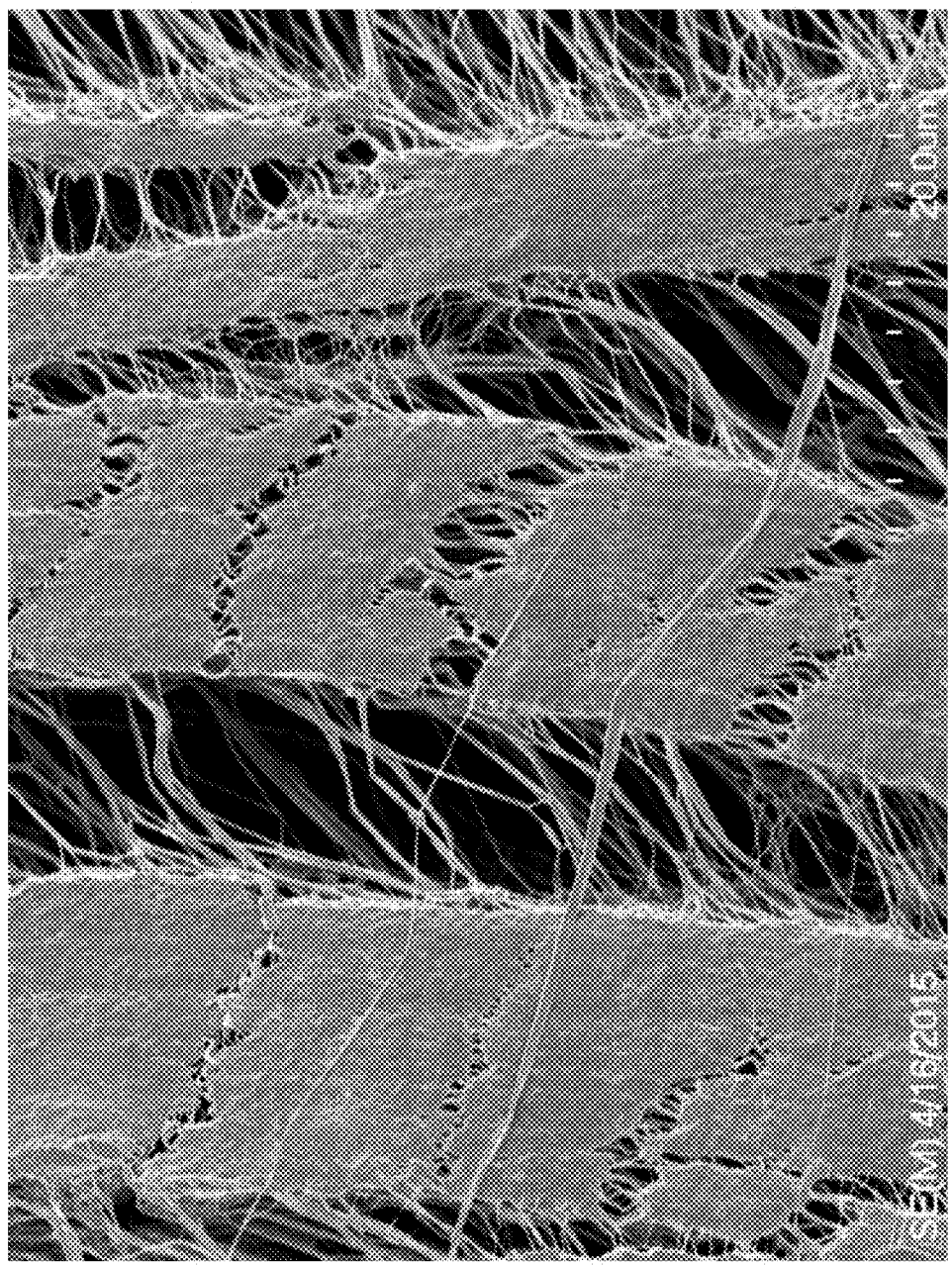
FIG. 16B is a scanning electron micrograph of the surface of the first PTFE membrane in the composite article of Example 8 taken at 2500× according to at least one embodiment of the invention.

The resultant composite article had a first surface and a second surface, representative of the first and second PTFE membranes, respectively, as described above. An optical microscopic image of the first surface of the composite article taken at 7× is shown in FIG. 15. An optical microscopic image of the first surface of the composite article taken at 32× is shown in FIG. 16. FIGS. 15 and 16 show the strands of interconnected nodes forming a visible pattern on the first surface (i.e., the first PTFE membrane) of the composite article. FIG. 16A is a scanning electron micrograph (SEM) of the surface of the first PTFE membrane in the composite article taken at 100× which shows the interconnected nodes forming the strands.

The composite article had a thickness of 0.171 mm and a bulk density of 0.16 g/cc. The bubble point was measured using the run setting BP_9-50 psi. Two test conditions were run. In the first test, the first PTFE membrane of the composite article was facing the metal plate. In the second test, the second PTFE membrane of the composite article was facing the metal plate. The bubble point was measured to be 23.64 psi and 26.25 psi, respectively.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A method of forming a composite article comprising:
    obtaining a first PTFE membrane having a first surface and a second surface;
    obtaining a second PTFE membrane having a matrix tensile strength that is greater than a matrix tensile strength of the first PTFE membrane;
    positioning said second PTFE membrane on said second surface of said first membrane to form a layered product;
    expanding said layered product in the y direction at an engineering strain rate from about 0.5%/sec to about 300%/sec and a stretch rate from about 10% to about 350% to form an expanded product; and
    expanding said expanded product in the x-direction at an engineering strain rate from about 3% to about 600% and a stretch ratio from about 0% to about 2000% to form a composite article,
    wherein said first surface of said composite article includes a plurality of strands raised from said first surface, each said strand having a length equal to or greater than about 1.5 mm,
    wherein said first surface of said composite article corresponds to said first surface of said first PTFE membrane; further comprising applying an adhesive to one of said first PTFE membrane and said second PTFE membrane to adhere said first PTFE membrane to said second PTFE membrane.

2. The method of claim 1, further comprising sintering said composite article.

* * * * *